(12) United States Patent
Kodaira et al.

(10) Patent No.: US 12,042,972 B2
(45) Date of Patent: Jul. 23, 2024

(54) INJECTION MOLDING SYSTEM WITH CONVEYORS TO INSERT OR EJECT MOLDS

(71) Applicant: CANON U.S.A., INC., Melville, NY (US)

(72) Inventors: Koki Kodaira, Tokyo (JP); Yuichi Yanahara, Moriyama (JP); Yohei Minatoya, Bunkyo-ku (JP)

(73) Assignees: Canon Virginia, Inc., Newport News, VA (US); Canon U.S.A., Inc., Melville, NY (US)

( * ) Notice: Subject to any disclaimer, the term of this patent is extended or adjusted under 35 U.S.C. 154(b) by 128 days.

(21) Appl. No.: 17/434,341

(22) PCT Filed: Feb. 27, 2020

(86) PCT No.: PCT/US2020/020213
§ 371 (c)(1),
(2) Date: Aug. 26, 2021

(87) PCT Pub. No.: WO2020/180626
PCT Pub. Date: Sep. 10, 2020

(65) Prior Publication Data
US 2022/0143888 A1    May 12, 2022

Related U.S. Application Data

(60) Provisional application No. 62/812,768, filed on Mar. 1, 2019.

(51) Int. Cl.
*B29C 45/84* (2006.01)
*B29C 45/04* (2006.01)
(Continued)

(52) U.S. Cl.
CPC .......... *B29C 45/84* (2013.01); *B29C 45/0433* (2013.01); *B29C 45/1742* (2013.01);
(Continued)

(58) Field of Classification Search
CPC ................. B29C 45/84; B29C 45/17
(Continued)

(56) References Cited

U.S. PATENT DOCUMENTS 809,554 A * 1/1906 Cole .................... B29C 45/4005
425/236
3,412,432 A * 11/1968 Fuglsang-Madsen ......................
B29C 45/08
425/570
(Continued)

FOREIGN PATENT DOCUMENTS

CN    108040473 A    5/2015
CN    106863964 A    6/2017
(Continued)

OTHER PUBLICATIONS

Machine translation JP2013095040A (Year: 2013).*
(Continued)

*Primary Examiner* — Jacob T Minskey
*Assistant Examiner* — Wayne K. Swier
(74) *Attorney, Agent, or Firm* — Canon U.S.A., Inc., IP Division

(57) ABSTRACT

An injection molding system includes an injection molding apparatus that performs injection molding, a first conveyor apparatus on one side of the injection molding apparatus to eject and insert a first mold through a first opening of the injection molding apparatus, and a second conveyor apparatus located on a second side of the injection molding apparatus to eject and insert a second mold through a second opening of the injection molding apparatus, where the
(Continued)

improvement of the injection molding apparatus includes a first door to cover the first opening, a second door to cover the second opening, and a controller that prohibits injection molding with the first mold in a case where the second door is opened.

16 Claims, 21 Drawing Sheets

(51) Int. Cl.
  *B29C 45/17* (2006.01)
  *B29C 45/76* (2006.01)
  *G05B 9/02* (2006.01)
(52) U.S. Cl.
  CPC .......... *B29C 45/1756* (2013.01); *B29C 45/76* (2013.01); *G05B 9/02* (2013.01)
(58) Field of Classification Search
  USPC ........................................................ 425/217
  See application file for complete search history.

(56) References Cited

U.S. PATENT DOCUMENTS

| 4,564,348 | A | * | 1/1986 | Hehl | ........................ | B29C 45/17 |
|---|---|---|---|---|---|---|
| | | | | | | 198/950 |
| 4,737,095 | A | * | 4/1988 | Hehl | ..................... | B29C 45/176 |
| | | | | | | 414/744.2 |
| 4,883,418 | A | * | 11/1989 | Hehl | ..................... | B02C 18/148 |
| | | | | | | 241/34 |
| 6,062,843 | A | | 5/2000 | Yamaura | | |
| 7,553,439 | B1 | | 6/2009 | Hughes et al. | | |
| 2004/0099995 | A1 | | 5/2004 | Hughes et al. | | |
| 2010/0244314 | A1 | | 9/2010 | Kato et al. | | |
| 2016/0236390 | A1 | | 8/2016 | Franksson et al. | | |
| 2018/0009146 | A1 | | 1/2018 | Nakamura | | |

FOREIGN PATENT DOCUMENTS

| CN | 107584725 A | | 1/2018 | | |
|---|---|---|---|---|---|
| DE | 698 18 920 T2 | * | 9/2004 | ............. | B29C 45/16 |
| JP | 6-297534 A | | 10/1994 | | |
| JP | H06-86084 B2 | * | 11/1994 | ............. | B29C 45/12 |
| JP | 2013095040 A | | 5/2013 | | |
| JP | 2014-28491 A | | 2/2014 | | |
| JP | 2018001738 A | | 1/2018 | | |

OTHER PUBLICATIONS

Machine translation JPH0686084B2 (Year: 1994).*
Machine translation DE69818920T2 (Year: 2004).*
Machine translation CN106863694A (Year: 2017).*

* cited by examiner

States of Components

| Components | State 1 | State 2 | State 3 | State 4 | State 5 | State 6 |
|---|---|---|---|---|---|---|
| 31A — Conveyance Unit (Left) | Home Position | Inserting Mold | Ejecting Mold | Mold in Injection Molding Machine | | |
| 32A, 322A — Temperature Controller (Left) | 1st Temperature (Low); Ready for Mold Change | Raising Mold Temperature | Lowering Mold Temperature | $2^{nd}$ Temperature (High) Ready for Molding | | |
| 302A — Conveyer Door (Left) | Closed - Locked | Closed - Unlocked | Open | | | |
| 100A — Mold (left) | Placed on Conveyor - Not Ready | Placed on Conveyor - Ready | Being Inserted | Being Ejected | Not Placed on Conveyor | |
| 350A — Alert Device (Left) | Idle | Exchange Ready (Unload Notice) | Being Inserted | Being Ejected | Advance Warning (Insertion) | Advance Warning (Ejection) |
| 2 — Injection Molding Machine | Idle | Preparing | N-th Molding Being Performed | N-th Parallel Molding Being Performed | Mold Ejection Ready (Left/Right) | Mold Insertion Ready (Left/Right) |
| ... | | | | | | |

FIG. 7

Molding Conditions

| Conditions | Sub-conditions | Data Type |
|---|---|---|
| Condition ID | | Integer |
| Mold ID | | Integer |
| Number of Shots | | Integer |
| Injection Molding Conditions | Clamping Conditions | (Variables) |
| | Injection Conditions | (Variables) |
| | Pressure Holding Conditions | (Variables) |
| | Cooling Conditions | (Variables) |
| | Opening Conditions | (Variables) |
| | Molded-Part Ejection Conditions | (Variables) |
| Cycle Time | | Integer |
| Cooling Time | | Integer |
| Parallel Molding Available | | Boolean |
| Average Preparation Time | | Integer |
| Average Unload Time | | Integer |
| . . . | | |

FIG. 8A

Molding Task List

| | Molding | Status | Est. Total Time | Est. Time to Complete |
|---|---|---|---|---|
| 1 | Condition ID # # # # # # 1 | Finished | n/a | n/a |
| 2 | Condition ID # # # # # # 2 | Molding Performed | # # | # # |
| 3 | Condition ID # # # # # # 3 | Prepared; Ready for Insertion | # # | # # |
| 4 | Condition ID # # # # # # 4 | Waiting | # # | # # |
| 5 | Condition ID # # # # # # 5 | Waiting | # # | # # |
| 6 | Condition ID # # # # # # 6 | Nor Scheduled yet | # # | # # |
| . | . . . | . . . | . . . | . . . |

FIG. 8B

Molding Queue

| | Queue |
|---|---|
| 1 | (Condition ID # # # # # # # 3) |
| 2 | (Condition ID # # # # # # # 4) |
| . | |
| . | |
| . | |

FIG. 8C

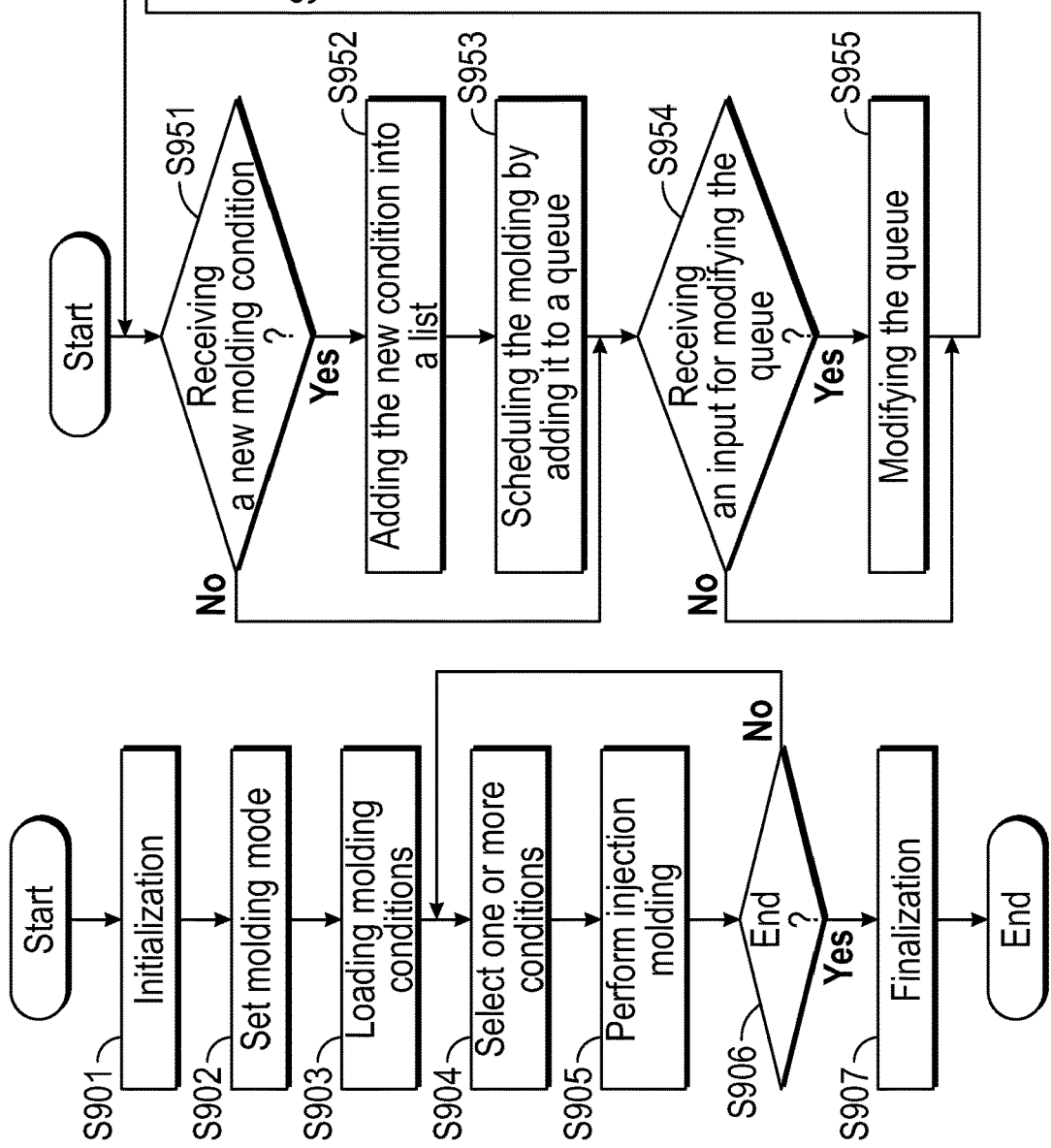

INJECTION MOLDING SYSTEM WITH CONVEYORS TO INSERT OR EJECT MOLDS

CROSS-REFERENCE TO RELATED APPLICATION

This application is a National Phase Application of PCT Application No. PCT/US2020/020213, filed on Feb. 27, 2020 which claims the benefit of U.S. Application 62/812,768, filed Mar. 1, 2019, all of which are incorporated by reference herein in its entirety.

BACKGROUND

Field

The present disclosure relates to an injection molding system.

Description of Related Art

Manufacturing of molded parts by an injection molding machine include clamping a mold, injecting a resin into the mold, pressing the resin into the mold at a high pressure to compensate for a volume decrease due to solidification of the resin, keeping the molded part in the mold until the resin solidifies, and ejecting the molded part from the mold. These stages of injection molding are repeatedly performed.

After a predetermined number of moldings are performed with one mold, the mold is ejected from the injection molding machine. The next mold to be used is setup and inserted into the injection molding machine. This mold is then used for a predetermined number of injection moldings. This process can often take time and resources, and the injection molding machine typically remains idle during this process. This can affect overall productivity. In addition, because the mold is heavy and is heated up when it is used, operator safety needs to be taken into consideration.

A method that uses two molds with one injection molding machine in order to enhance productivity has been proposed. For example, US 2018/0009146/Japanese patent publication No. 2018-001738/VN20160002505 are seen to discuss a system in which conveying devices 3A and 3B are arranged on both sides of an injection molding machine 2. In this system, molded parts are manufactured while alternating a plurality of molds by the conveying devices 3A and 3B for the one injection molding machine 2. FIG. 20 illustrates an injection molding system of US 2018/0009146/Japanese patent publication No. 2018-001738/VN20160002505.

SUMMARY

According to an aspect of the present disclosure, an injection molding system includes an injection molding apparatus configured to perform injection molding, a first conveyor apparatus on one side of the injection molding apparatus to eject and insert a first mold through a first opening of the injection molding apparatus, and a second conveyor apparatus located on a second side of the injection molding apparatus to eject and insert a second mold through a second opening of the injection molding apparatus, where the improvement of the injection molding apparatus includes a first door to cover the first opening, a second door to cover the second opening, and a controller configured to prohibit injection molding with the first mold in a case where the second door is opened.

Other aspects, features, and techniques of present disclosure are described below with reference to the drawings.

BRIEF DESCRIPTION OF THE DRAWINGS

The accompanying drawings, which are incorporated herein and form part of the specification, illustrate various embodiments, objects, features, and advantages of the present disclosure.

FIG. 7 illustrates a chart illustrating states defined for components of the injection molding system according to an exemplary embodiment.

FIG. 8A illustrates a set of molding conditions according to an exemplary embodiment.

FIG. 8B illustrates a list of injection molding tasks according to an exemplary embodiment.

FIG. 8C illustrates a queue of 'waiting' molding tasks scheduled to be performed according to an exemplary embodiment.

FIG. 9A is a flowchart illustrating a process of an injection molding system performing injection molding according to an exemplary embodiment.

FIG. 9B is a flowchart illustrating processes to update the molding task list and the molding queue according to an exemplary embodiment.

Figure 1:
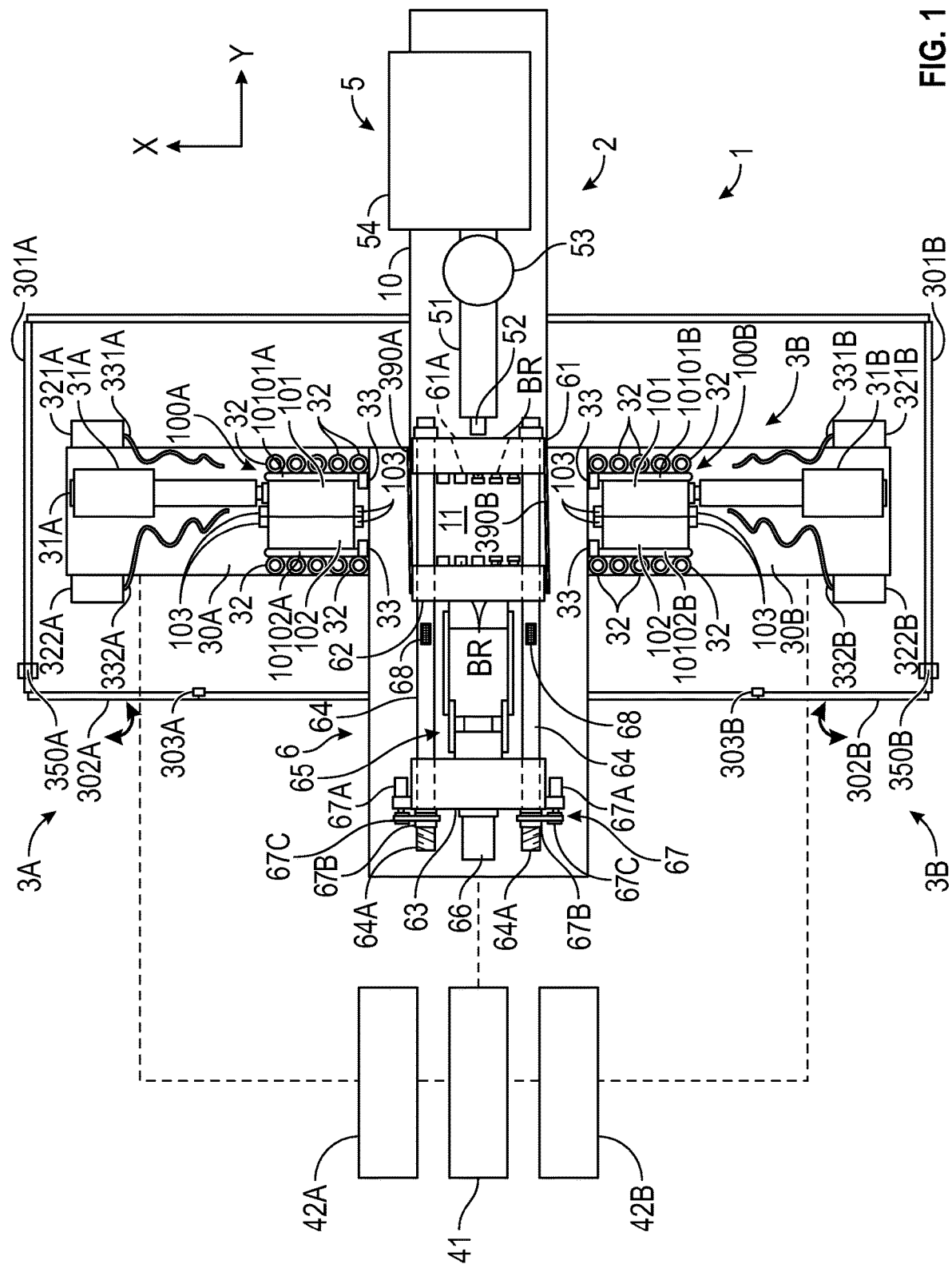
FIG. 1 illustrates a top view of an injection molding system 1 according to an exemplary embodiment.

Throughout the Figures, the same reference numerals and characters, unless otherwise stated, are used to denote like features, elements, components or portions of the illustrated embodiments. While the subject disclosure is described in detail with reference to the Figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION OF EXEMPLARY EMBODIMENTS

The present disclosure has several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

With reference to the drawings, an injection molding system according to an embodiment of the present disclosure will be explained. The arrow symbols X and Y in each Figure indicate horizontal directions that are orthogonal to each other, and the arrow symbol Z indicates a vertical (upright) direction with respect to the ground.

FIGS. 20 and 2-4 illustrate an injection molding system discussed in US 2018/0009146/Japanese patent publication No. 2018-001738/VN20160002505 and are being provided herein for information/description purposes only.

The injection molding system 1 includes a horizontal type injection molding machine 2 (IMM2), and conveyor devices 3A and 3B. The injection molding system 1 is configured to manufacture molded parts while inserting and ejecting multiple molds by conveyor devices 3A and 3B. Two molds, 100A and 100B are used.

The mold 100A/100B is a pair of a fixed mold 101 and a movable mold 102, which is opened/closed in relation to the fixed mold 101. The molded part is molded by injecting a molten resin into a cavity formed between the fixed mold 101 and the movable mold 102. Clamping plates 101a and 102a are respectively fixed to the fixed mold 101 and the movable mold 102. The clamping plates 101a and 102a are used to lock the mold 100A/100B to a molding operation position 11 (mold clamping position) of the IMM2.

For the mold 100A/100B, a self-closing unit 103 is provided for maintaining a closed state between the fixed mold 101 and the movable mold 102. The self-closing unit 103 enables preventing the mold 100A/100B from opening after unloading the mold 100A/100B from the IMM2. The self-closing unit 103 maintains the mold 100A/100B in a closed state using a magnetic force. The self-closing unit 103 located at a plurality of locations along opposing surfaces of the fixed mold 101 and the movable mold 102. The self-closing unit 103 is a combination of an element on the side of the fixed mold 101 and an element on the side of the movable mold 102. For the self-closing unit 103, typically two or more pair are installed for one of the molds 100A and 100B A conveying device 3A loads and unloads the mold 100A onto/from the molding operation position 11 of the IMM2. A conveying device 3B loads and unloads the mold 100B onto/from the molding operation position 11. The conveying device 3A, the IMM2, and the conveying device 3B are arranged to be lined up in this order in the X-axis direction. In other words, the conveying device 3A and the conveying device 3B are arranged laterally with respect to the IMM2 to sandwich the IMM2 in the X-axis direction. The conveying devices 3A and 3B are arranged to face each other, and the conveying device 3A is arranged on one side laterally of the IMM2, and the conveying device 3B is arranged on the other side respectively adjacent. The molding operation position 11 is positioned between the conveying device 3A and the conveying device 3B. The conveying device 3A includes a frame 30 a plurality of rollers 32, and a plurality of rollers 33. The conveying device 3B includes a frame 30, a conveyance unit 31B, a plurality of rollers 32, and a plurality of rollers 33. A conveying device controller 42A controls the conveying device 3A and a conveying device controller 42B controls the conveying device 3B.

The frame 30 is a skeleton of the conveying device 3A/3B, and supports the conveyance unit 31B, and the pluralities of rollers 32 and 33. The conveyance unit 31B is an apparatus that moves the mold 100A/100B back and forth in the X-axis direction, and that removes and inserts the mold 100A/100B in relation to the molding operation position 11. The conveyance unit 31B is controlled by the conveyance device controller 42B.

The plurality of rollers 32 configure a row of rollers arranged in the X-axis direction, where two rows are configured separated in the Y-axis direction. The plurality of rollers 32 rotate around the axis of revolution in the Z-axis direction, and guide movement in the X-axis direction of the mold 100A/100B contacting the side surfaces of the mold 100A/100B (the side surfaces of the clamping plates 101a and 102a) and supporting the mold 100A/100B from the side. The plurality rollers 33 configure a row of rollers arranged in the X-axis direction, where two rows are configured separated in the Y-axis direction. The plurality of rollers 33 rotate around the axis of revolution in the Y-axis direction, and cause movement in the X-axis direction of the mold 100A/100B to be smooth, supporting the bottom surfaces of the mold 100A/100B (the bottom surfaces of the clamping plates 101a and 102a) and supporting the mold 100A/100B from below.

The controller 41 controls the IMM2, the controller 42A controls the conveyor device 3A, and the controller 42B controls the conveyor device 3B. Each of the controllers 41, 42A and 42B includes, for example, a processor such as a CPU, a RAM, a ROM, a storage device such as a hard disk, and interfaces connected to sensors or actuators (not illustrated). The processor executes programs stored in the storage device. An example of a program (control) that the controller 41 executes is described below. The controller 41 is communicably connected with the controllers 42A and 42B, and provides instructions related to the conveyance of the mold 100A/100B to the controllers 42A and 42B. The controllers 42A and 42B, if loading and unloading of the mold 100A/100B terminates, transmit a signal for operation completion to the controller 41. In addition, the controllers 42A and 42B transmit an emergency stop signal at a time of an abnormal occurrence to the controller 41.

Figure 2:
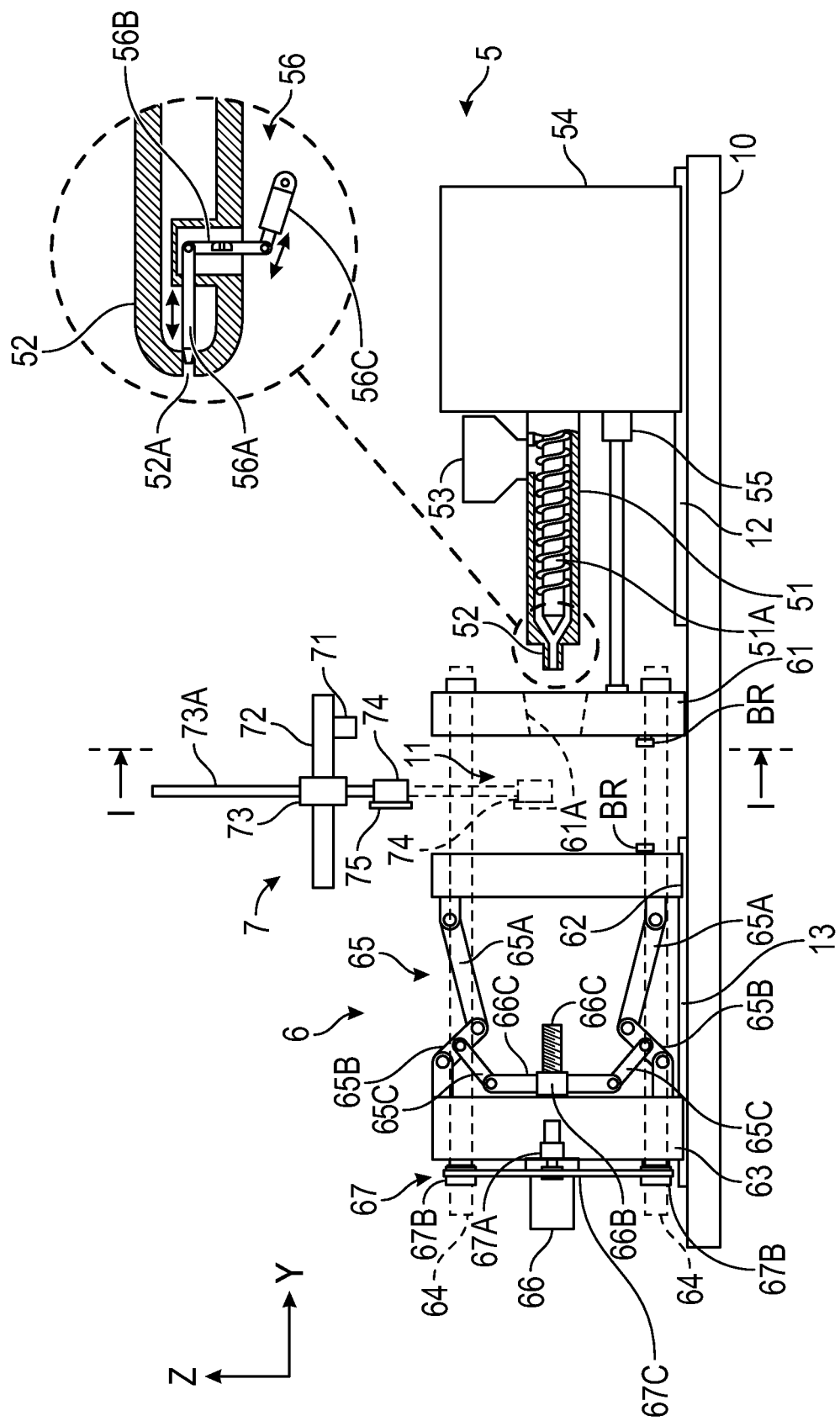
FIG. 2 is a side view of an injection molding machine.
Figure 3:
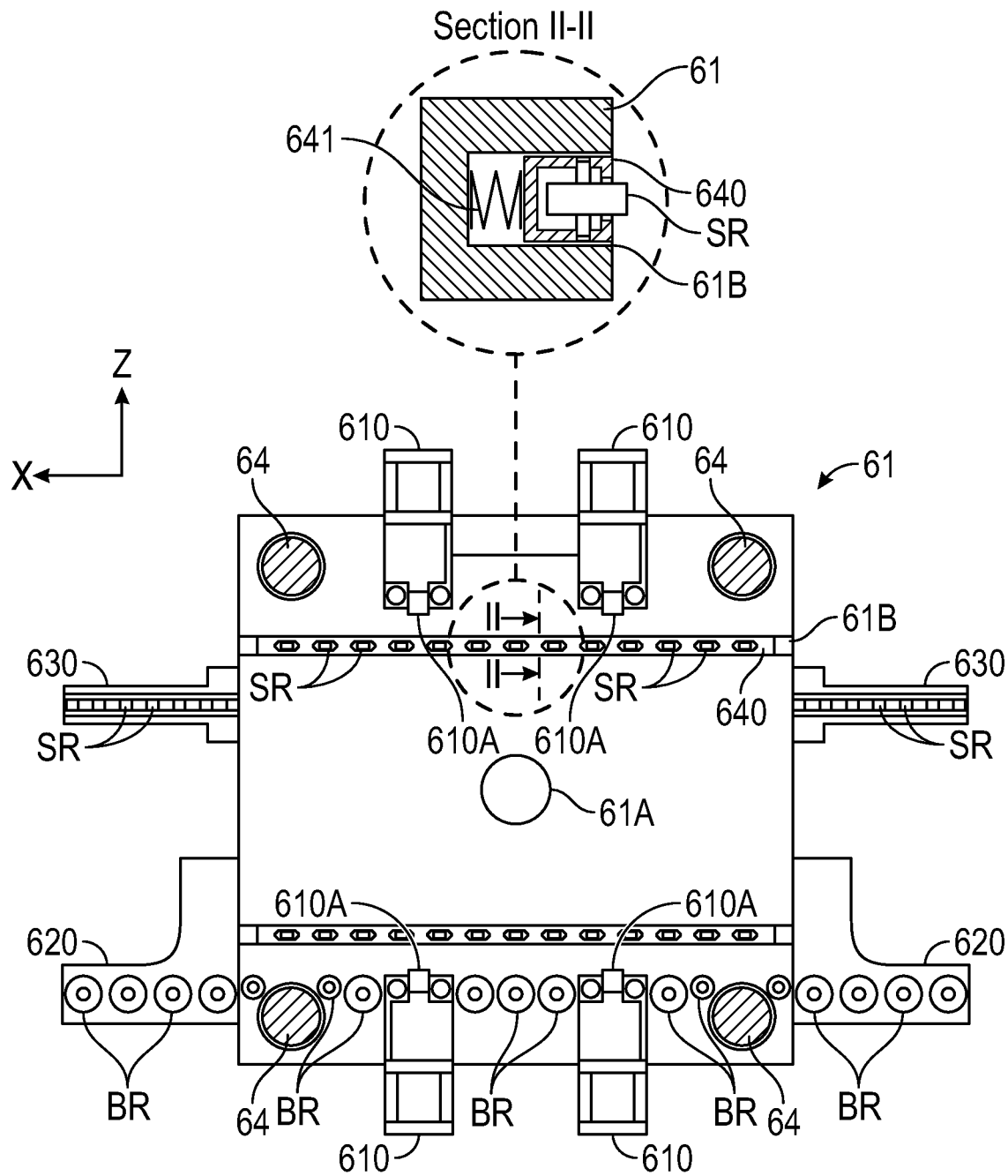
FIG. 3 is an end view of the fixed platen 61, and a figure view from the arrow direction of line I-I in FIG. 2.
Figure 4:
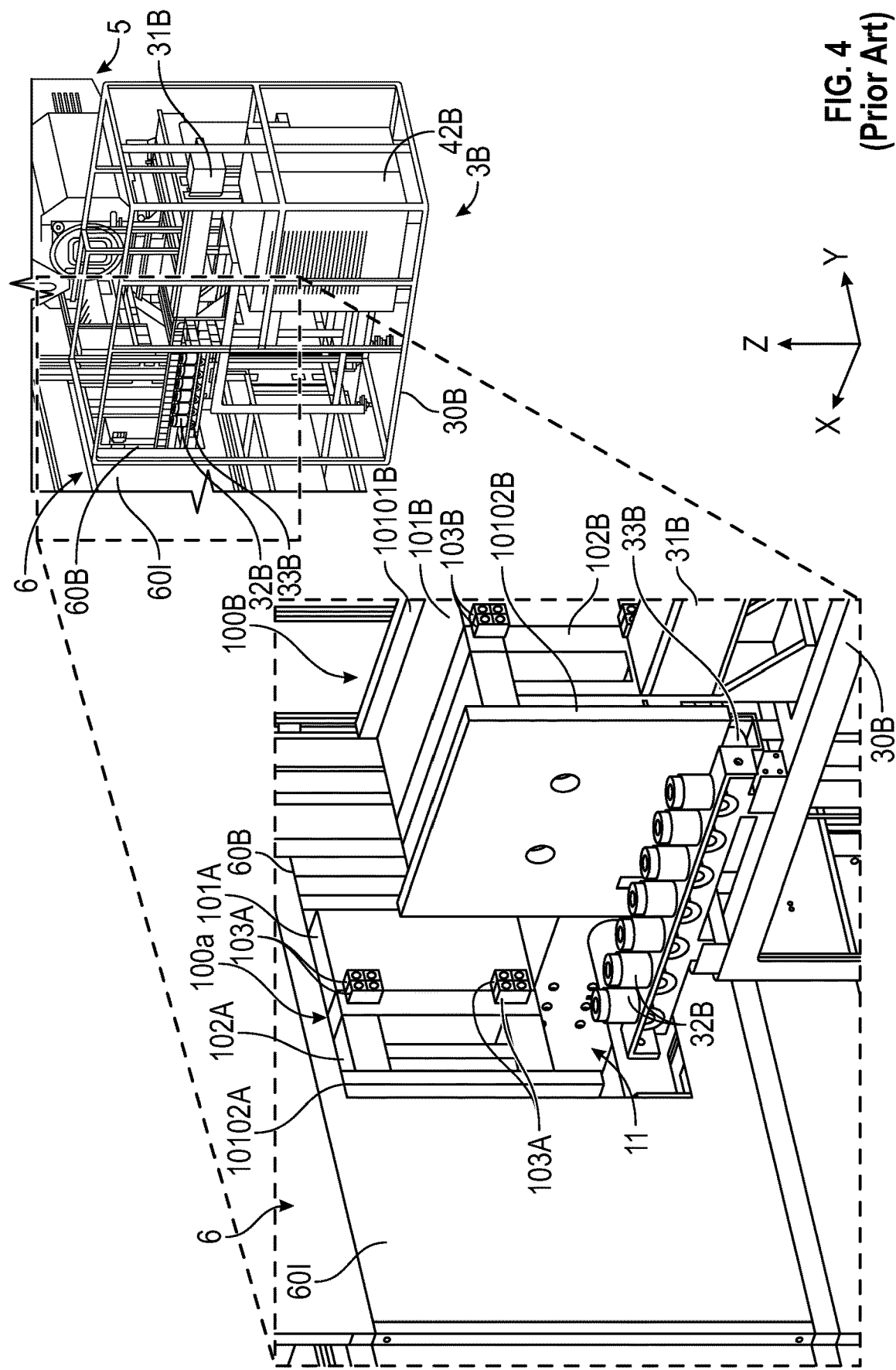
FIG. 4 is a partial perspective view of the configuration of the periphery of a molding operation position.

FIG. 2 illustrates a side view of the IMM2. FIG. 3 illustrates an end view of a fixed platen 61, and a figure viewing from the arrow direction of the I-I line in FIG. 2. FIG. 4 illustrates a partial perspective view for describing the configuration of a periphery of the molding operation position 11.

Figure 20:
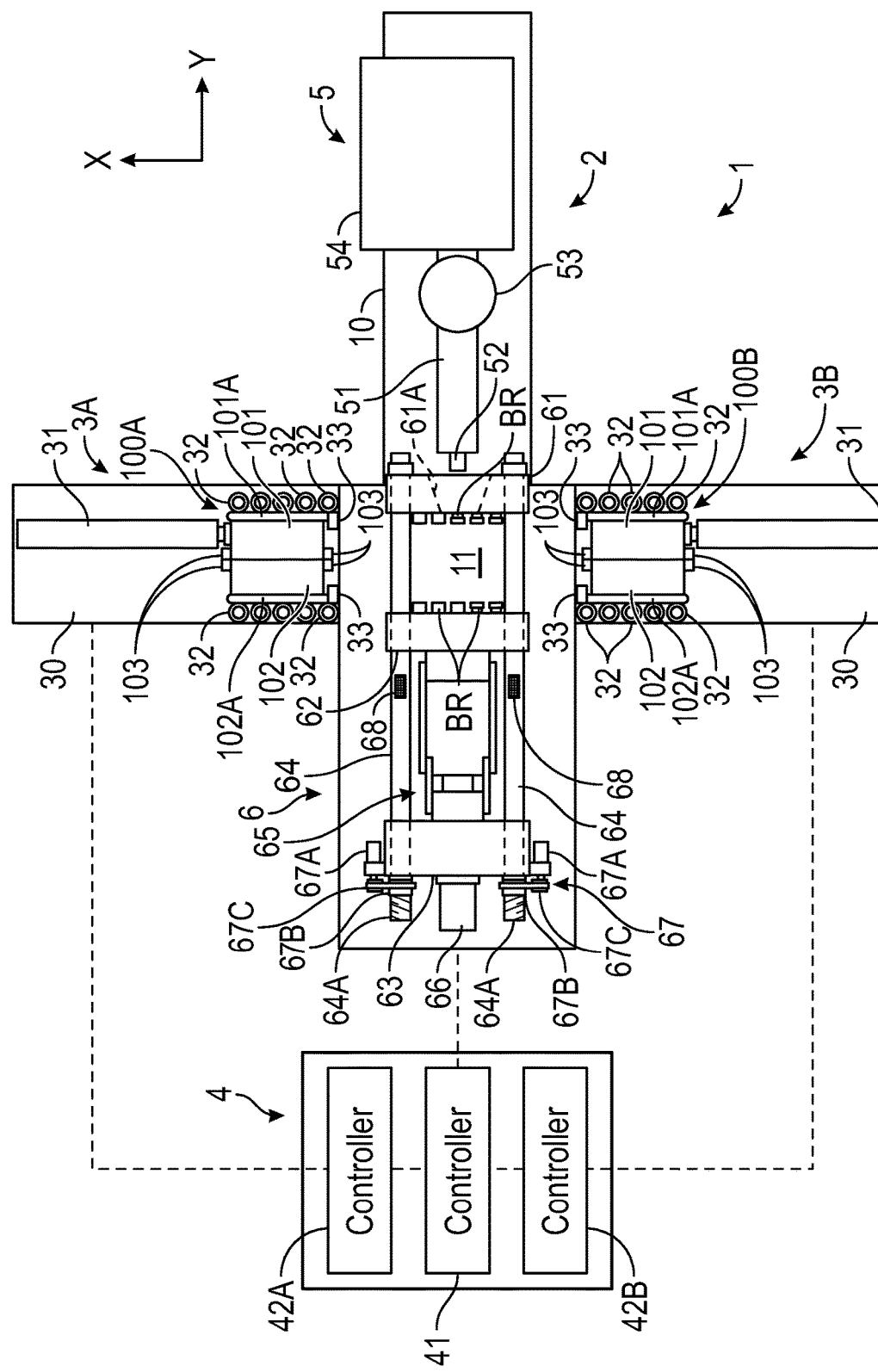
FIG. 20 illustrates an injection molding system.

With reference to FIG. 20 and FIG. 2, the IMM2 includes an injecting apparatus 5, a clamping apparatus 6, a take-out robot 7 for ejecting a molded part, and the controller 41. The injecting apparatus 5 and the clamping apparatus 6 are arranged on a frame 10 in the Y-axis direction.

The injecting apparatus 5 includes an injection cylinder 51 that is arranged to extend in the Y-axis direction. The injection cylinder 51 includes a heating device (not illustrated) such as a band heater, and melts a resin introduced from a hopper 53. A screw 51a is integrated into the injection cylinder 51, and rotating the screw 51a results in plasticizing and measuring the resin introduced into the injection cylinder 51. Movement in the axial direction (Y-axis direction) of the screw 51a, it is possible to inject a molten resin from an injection nozzle 52.

A shut-off nozzle that opens/closes a discharge port can be used as the nozzle 52. However, any mechanism that would enable implementation of the nozzle 52 function is applicable. FIG. 2 illustrates an example of a shut-off nozzle. A pin 56a for opening/closing the discharge port 52a is used as an opening/closing mechanism 56. The pin 56a is connected with an actuator (a cylinder) 56c via a link 56b and the discharge port 52a is opened and closed via the operation of the actuator 56c.

A driving unit 54 supports the injection cylinder 51. The driving unit 54 includes a motor (not illustrated) for plasticizing and measuring the resin by rotationally driving the screw 51a, and a motor (not illustrated) for driving the screw 51a to move forward/backward in the axial direction. The driving unit 54 can move forward/backward in the Y-axis direction along a rail 12 on the frame 10. The driving unit 54 can also include an actuator, for example, an electrically driven cylinder, 55 that causes the injecting apparatus 5 to move forward/backward in the Y-axis direction.

The clamping apparatus 6 performs a clamping and opening and closing of the molds 100A/100B. In the clamping apparatus 6, the following are arranged in order in the Y-axis direction: the fixed platen 61, a movable platen 62, and a movable platen 63. Through platens 61 to 63, a plurality of tie-bars 64 pass. Each of the tie-bars 64 is an axis that extends in the Y-axis direction, one end of which is fixed to the fixed platen 61. Each of the tie-bars 64 is inserted into a respective through hole formed in the movable platen 62. The other end of each of the tie-bars 64 is fixed to the movable platen 63 through an adjusting mechanism 67. The movable platens 62 and 63 can move in the Y-axis direction along a rail 13 on the frame 10, and the fixed platen 61 is fixed to the frame 10.

A toggle mechanism 65 is arranged between the movable platen 62 and the movable platen 63. The toggle mechanism 65 causes the movable platen 62 to move forward/backward in the Y-axis direction in relation to the movable platen 63, i.e., in relation to the fixed platen 61. The toggle mechanism 65 includes links 65a to 65c. The link 65a is rotatably connected to the movable platen 62. The link 65b is pivotably connected to the movable platen 63. The link 65a and the link 65b are pivotably connected to each other. The link 65c and the link 65b are pivotably connected to each other. The link 65c is pivotably connected to an arm 66c.

The arm 66c is fixed on a ball nut 66b. The ball nut 66b engages a ball screw shaft 66a that extends in the Y-axis direction, and moves forward/backward in the Y-axis direction by rotation of the ball screw shaft 66a. The ball screw shaft 66a is supported such that it is free to rotate by the movable platen 63, and a motor 66 is supported by the movable platen 63. The motor 66 rotationally drives the ball screw shaft 66a. The amount of rotation of the motor 66 is detected by a sensor (not illustrated), such as a rotary encoder. By driving the motor 66, while detecting the amount of rotation of the motor 66, it is possible to perform clamping and opening and closing of the molds 100A/100B.

The IMM2 includes sensors 68 for measuring a clamping force. In the exemplary embodiment, each sensor 68 is a strain gauge provided on the tie-bar 64, and calculates a clamping force by detecting a distortion of the tie-bar 64.

The adjusting mechanism 67 includes nuts 67b supported to freely rotate on the movable platen 63, motors 67a as driving sources, and transfer mechanisms for transferring the driving force of the motors 67a to the nuts 67b. Each of the tie-bars 64 passes through a hole formed in the movable platen 63, and engages with the nut 67b. By causing the nuts 67b to rotate, the engagement positions in the Y-axis direction between the nuts 67b and the tie-bars 64 change. That is, the position at which the movable platen 63 is fixed in relation to the tie-bar 64 changes. With this, it is possible to cause a space between the movable platen 63 and the fixed platen 61 to change, and thereby it is possible to adjust a clamping force or the like.

The molding operation position 11 is a region between the fixed platen 61 and the movable platen 62. The mold 100A/100B introduced into the molding operation position 11 are sandwiched between the fixed platen 61 and the movable platen 62 and thereby clamped. Opening and closing in based on movement of the movable mold 102 by movement of the movable platen 62 is performed.

FIG. 3 illustrates an opening portion 61a in a central portion of the fixed platen 61 through which the nozzle 52 moves forward/backward. To the surface on the side of the movable platen 62 (called an inner surface) of the fixed platen 61 a plurality of rollers BR are supported such that they are free to rotate. The plurality of rollers BR rotate around the axis of revolution in the Y-axis direction, and cause movement in the X-axis direction of the mold 100A/100B to be smooth, supporting the bottom surfaces (the bottom surface of the clamping plate 101a) of the mold 100A/100B and supporting the mold 100A/100B from below. On both sides in the X-axis direction of the fixed platen 61, a roller supporting body 620 is fixed, and the plurality of rollers BR are supported by the roller supporting body 620.

On the inner surface of the fixed platen 61, grooves 61b that extend in the X-axis direction are formed. The grooves 61b are formed in two rows separated vertically. On each of the grooves 61b a roller unit 640 is arranged. For the roller unit 640, a plurality of rollers SR are supported such that they are free to rotate. The plurality of rollers SR rotate around the axis of revolution in the Z-axis direction, and guide movement in the X-axis direction of the mold 100A/100B contacting the outer surfaces of the mold 100A/100B (the outer surface of the clamping plate 101a) and supporting the mold 100A/100B from the side. As illustrated in the cross sectional view of the line II-II, while the roller unit 640, by a bias of a spring 641, is positioned at a position at which the roller SR protrudes from the groove 61b, at a time of clamping it is retracted in the groove 61b, and positioned at a position at which the roller SR does not protrude from the groove 61b. The roller unit 640 can prevent the inner surfaces of the mold 100A/100B and the fixed platen 61 from contacting and damaging the inner surfaces at a time of alternating the mold 100A/100B, and the roller unit 640 does not impede the inner surface of the fixed platen 61 and the mold 100A/100B being closed at a time of clamping.

On both sides in the X-axis direction of the fixed platen 61, a roller supporting body 630 is fixed, and multiple rollers SR are supported by the roller supporting body 630.

On the fixed platen 61, a plurality of fixing mechanisms (clamps) 610 are arranged for fixing the fixed mold 101 to the fixed platen 61. Each fixing mechanism 610 includes an engaging portion 610*a* that engages with the clamping plate 101*a*, and a built-in actuator (not illustrated) that moves the engaging portion 610*a* between an engagement position and an engagement release position.

Note that for the movable platen 62, similarly to the fixed platen 61, a plurality of rollers BR, the roller supporting bodies 620 and 630, the roller unit 640, and the fixing mechanism 610 for fixing the movable mold 102 are arranged.

As illustrated in FIG. 4, the periphery of the clamping apparatus 6 is surrounded by a cover (exterior covering plate) 60 for safety, but openings 60B through which the mold 100A/100B pass is formed on the sides of the molding operation position 11 for alternating the mold 100A/100B. Each opening 60B is typically continuously open, enabling free removal and insertion of the mold 100A/100B from and to the molding operation position 11.

Returning to FIG. 2, the take-out robot 7 will now be described. The take-out robot 7 includes a rail 71 that extends in the X-axis direction, and a movable rail 72 that can move in the X-axis direction on the rail 71. The movable rail 72 is arranged to extend in the Y-axis direction, and a slider 73 is arranged on the movable rail 72. The slider 73 moves in the Y-axis direction guided by the movable rail 72, and moves up and down an elevating shaft 73*a* in the Z-axis direction. On a lower end of the elevating shaft 73*a*, a vacuum head 74 is arranged, and on the vacuum head 74, a chuck plate 75 specialized to a molded part is mounted.

The take-out robot 7, after opening, moves the vacuum head 74 between the stationary mold 101 and the movable mold 102 as illustrated by broken lines in FIG. 2 by the rail 71, the movable rail 7, and the slider 73, sticks to the molded part, and conveys it outside the mold 100A/100B.

Figure 5:
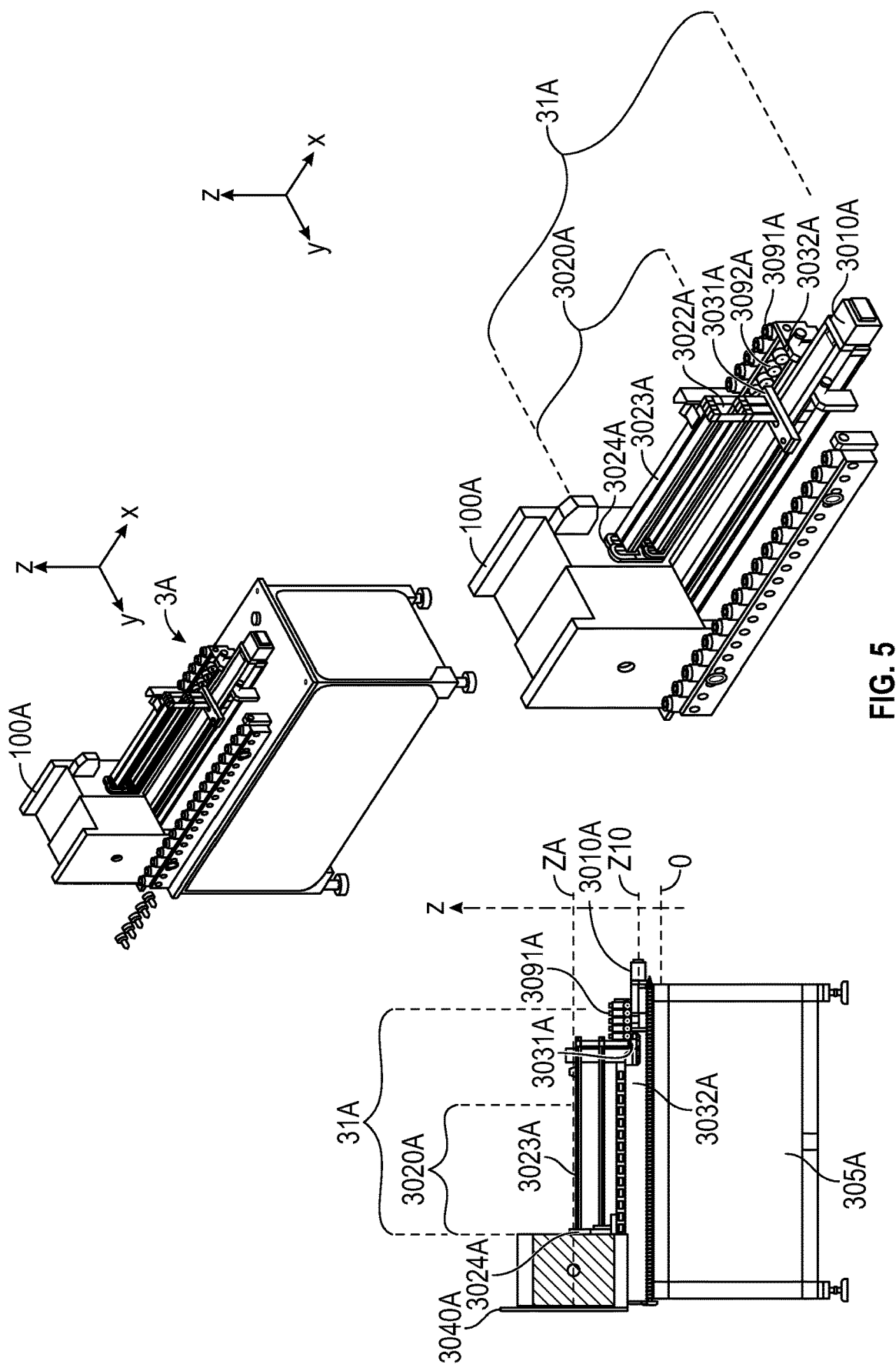
FIG. 5 is a side view of a conveyor device, where a mold is moved by driving an actuator.

FIG. 5 is a side view of the conveyor apparatus 3A. The conveyor apparatus 3A includes an actuator 3010 fixed on a table 305 and a connection member 3020. The actuator 3010 includes a slide 3032 that is movable with respect to fixed parts of the actuator 3010. The connection member 3020 includes a base plate 3031 fixed to the slide 3032, a shaft 3022 with tips inserted into a hole of the base plate 3031, and a bracket 3023 connected to the shaft 3022, and a fixture plate 3024 with one end connected to the bracket 3023 and the other end connected to the mold 100A. The connection member 3020 connects the mold 100A and the actuator 3010.

Moving the slide 3032 results in moving the actuator 3010, mold 100 that is linked to slide the 3032, the plate 3031, and the connection member 3020. Since the actuator 3010 is fixed to the table 305, the actuator 3010 and the table 305 do not move based on the movement of the mold 100A. The mold 100A is movable with respect to the actuator 3010 and the table 305.

The connection member 3020 is attached to the mold 100A with the fixture plate 3024, which is also fastened to the bracket 3023, which can, for example, include four discrete bars extending horizontally The bracket 3023 is fastened to the shaft 3022, which can include 2 discrete bars extending vertically. The shaft 3022 has a cam follower 3021 on its tip at the bottom. The base plate 3031 is fastened to the slide 3032, and the cam follower 3021 is inserted into the hole of the base plate 3031, thereby linking the mold 100A and the actuator 3010.

The width of the hole in the X-axis direction is slightly larger than the diameter of the cam follower 3021, which accommodates the cam follower 3021 but does not allow a shift in the X-axis direction for expected precise position control of the mold 100A. The width of the hole in the Y-axis direction is large enough for the cam follower 3021 to shift in the Y-axis direction to avoid damage to the actuator 3010 due to the mold's 100A shift in the Y-axis direction.

The following is a description of a situation where the mold 100A moves along the X-axis direction, and a situation where the actuator's 3010 centerline extending in the X-axis direction and the connection member's 3020 centerline extending in the X-axis direction are misaligned or shifted with each other in the Y-axis direction. More specifically, the connection member 3020 is misaligned with the actuator 3010 due to movement of the mold 100A in the Y-axis direction.

When the mold 100A is shifted in the Y-axis direction with respect to the actuator 3010, while the mold 100A is moving, the cam follower 3021 rotates in the hole or just slips along the hole of the base plate 3031 in the Y-axis direction. The cam follower 3021 can absorb the load generated due to the misalignment in the Y-axis direction between the actuator 3010 and the mold 100A. That is, even if the mold 100A is moved in the Y-axis direction, the load to the actuator 3010 or other components can be reduced by the cam follower 3021 and the hole. The larger the misalignment in the Y-axis direction between the mold 100A and the actuator 3010, the larger the load applied to the connection member 3020 and the actuator 3010 becomes. Thus, by shifting the connection member 3020 in the Y-axis direction, the load can be reduced or eliminated.

Without the shifting mechanism in the connection member 3020, and if the actuator 3010 and the mold 100A are rigidly linked, the center of the Y-axis direction for the mold 100A misaligns to the center of the Y-axis direction for the actuator 3010. The weight of the mold 100A and the load from amount of movement in the Y-axis direction would directly apply to the actuator 3010 and the connection member 3020. The connection member 3020 would warp in the Y-axis direction, and a load would also be applied to the actuator 3010 in the Y-axis direction. Providing the connection member 3020 as described above with reference to FIG. 5, the cam follower 3021 is movable in the Y-axis direction against the base plate 3031, and the load from the mold 100A shifting towards the Y-axis direction can be reduced or eliminated.

FIG. 5 illustrates a displacement of a center in the Z-axis direction of the actuator 3010A with respect to a Z=0 line as Z10, and a displacement of a center in the Z-axis direction of the mold 100A as ZA. As illustrated in FIG. 5, the origin of the Z-axis direction (Z=0) is at the surface of table 305A. Since the actuator 3010A is fixed to the table 305A, if the center in the Z-axis direction of the actuator 3010A is Z10 (datum position) and the center in the Z-axis direction of the mold 100A is ZA (datum position), the actuator 3010A and the mold 100A are not misaligned in the Z-axis direction.

The following is a description of a situation where the moving direction for the mold 100A is in the X-axis direction and if the center in the Z-axis direction of the mold 100A misaligns in the Z-axis direction from ZA. When the mold 100A moves, and if it is moved from the datum position in the Z-axis direction, in other words, when the center position in the Z-axis direction for the mold 100A misaligns in the Z-axis direction, the cam follower 3021 of the shaft 3022 moves along the slot in the Z-axis direction. The movement can absorb the load due to the misalignment in the Z-axis direction between the mold 100A and the actuator 3010. The cam follower 3021 slips along the inner wall of the slot in the Z-axis direction of the slot. This mechanism of the Z shift, which is the same as the Y shift, load applied to the actuator 3010 and the connection member 3020 can be reduced or eliminated.

Without the shifting mechanism of the connection member 3020, and if the mold 100A and the actuator 3010 are rigidly linked, the center in the Z-axis direction of the mold 100A would misalign in the Z-axis direction from ZA, the weight of the mold 100A and the load from the amount of movement in the Z-axis direction would be directly applied to the actuator 3010 and the connection member 3020. The connection member 3020 would warp in the Z-axis direction, and a load would also be applied to the actuator 3010A in the Z-axis direction. By providing the connection member 3010A as described below with reference to FIG. 5, the cam follower 3021A is movable in the Z-axis direction, and a load from the mold 100A shifting in the Y-axis direction is reduced or eliminated.

As described above, the present embodiment includes the cam follower 3021A and the slot on the base plate 3031A. This enables reduction of the load generated from the misalignment in the Z-axis direction, and/or in the Y-axis direction between the mold 100A and the actuator 3010. The above-described configuration prevents the actuator 3010 from receiving an excess load, and can reduce the possibility of damage to the connection member 3010 while reducing the load to the actuator 3010A. Damage to the actuator 3010A can be reduced and/or prevented, which results in reducing the cost of the injection molding system 1 since a larger actuator resistant to the loads does not need to be used for the actuator 3010. The above-described configuration also eliminates the need for excessively precise position adjustment for the table 305A or excessively precise position accuracy of the side rollers 32A and the bottom roller 33A with respect to the IMM2, which enables reduction in cost by easing machine parts precision and/or reduction in assembly time of the injection molding system 1.

The cam follower 3021A can have a shape with slippage, and the shape can be, for example, a round shape without a rotating mechanism or can be square shape. 'Slippage' as used herein refers to being movable with a low friction coefficient against the surface inside the slotted hole. While four bars with rectangular-shaped cross-sections are described above for the bracket 3023, other shapes and/or a different numbers of bars that would enable practice of the exemplary embodiment are applicable. In another exemplary embodiment, one or more shafts 3022A and one or more cam followers 3021A can be used, as long as the shafts 3022A and the cam followers 3021A have shapes and dimensions that overlap between the cam followers 3021A and the slot of the base plate 3031A.

FIG. 1 illustrates a configuration according to an exemplary embodiment of the present disclosure and provides an improvement over the configuration illustrated in FIG. 20. As illustrated in FIG. 1, conveyor devices 3A and 3B are surrounded by safety wall 301A and safety wall 301B respectively. Safety wall 301A/301B includes two parallel walls (hereinafter referred to as 'first walls) located along the X-axis direction and a wall (hereinafter referred to as "second wall") located along the Y-axis direction. One end of the first walls is fixed to the second wall and the other end of the first walls is fixed to an exterior covering plate 60 (see FIG. 4) of the IMM2.

As illustrated in FIG. 1, safety walls 301A and 301B along with the exterior covering plate define rectangular shaped areas (hereinafter referred to as "conveyor areas") that enclose conveyor devices 3A and 3B respectively. Because conveyor devices 3A and 3B move the molds 100A and 100B, operators need to be kept away from the conveyor devices 3A and 3B when the molds 100A and 100B are moved. The height of the first wall, the height of the second wall, and the size of the conveyor areas are situation specific and are designed as needed for safety and productivity purposes. In another exemplary embodiment, the conveyor areas need not be enclosed areas. However, should any gaps between devices, components, etc., exist in such a configuration, the size of these gaps are narrow to prevent insertion of operator's fingers, etc.

An alert device 350A/350B provides safety and productivity status/state related notification associated with the conveyor device 3A/3B and the IMM2. The alert device 350A/350B can be a buzzer, one or more LEDs, a display, any combination of these, or any other device, component, method that enables notification of safety and productivity related information. The alert device 350A is controlled by a conveyor device controller 42A while the alert device 350B is controlled by a conveyor device controller 42B. The alert device 350A/350A is typically situated in a location where operators have easy access to it. In one exemplary embodiment, the alert device 350A/350B is located on a top surface of the safety wall 301A/301B. In another exemplary embodiment, the injection molding system 1 includes one alert device that provides notifications to operators of the state/status of all conveyor devices and an injection molding machine.

The safety wall 301A/301B includes a safety door 302A/302B with a door lock 303A/303B. The safety wall 301A/301B and the safety door 302A/302B are located on the top panel of the frame 30A/30B. The safety door 302A/302B can be opened, for example, when operators unload the mold 100A/100B from the conveyor device 3A/3B, and can be closed and locked while the molds 100A and 100B are moved by the conveyor devices 3A and 3B. The door lock 303A/303B can be unlocked manually either from inside or outside the respective conveyor area. The safety door 302A/302B in combination with a mold door 390A/390B provides additional safety to operators working at conveyor devices 3A and 3B. The safety door 302A/302B and/or the door lock 303A/303B can be controlled electronically by the conveyor controller 42A/42B. In another exemplary embodiment, while conveyor devices 3A and 3B move the molds 100A and 100B, the conveyor controller 42A/42B shuts and/or locks the safety door 302A/302B to keep operators away from the conveyor areas.

When the mold door 390B is open and the opening 60B is exposed, ejection and insertion of the mold 100B from and to the molding operation position 11 can occur. The mold door 390B is slidable, can be opened or closed manually, and closes the opening 60B when closed. While in the present embodiment the mold door 390B is slidable, this movement method is not seen to be limiting and any method enabling opening and closing of the mold door 390B is applicable. When preparation work, such as replacing the mold 100B with another mold, the opening 60B can be closed by the mold door 390B. Another opening, not illustrated, is formed on the opposite side of the IMM2.

In another exemplary embodiment, the safety door 302A/302B includes a sensor to detect the open/close state of the door lock 303A/30B. In another exemplary embodiment, when the safety door 302B is opened, the controller 42B prevents the conveyance unit 31B from to ejecting/inserting the mold 100B. This reduces the possibility of operators contacting any moving components, such as the mold 100B or any part of the conveyance unit 31B.

In another exemplary embodiment, when one mold is inserted from one side of the IMM2, the mold door at that side of the IMM2 typically remains open since the conveyance unit 31B at that enters the IMM2 for inserting the mold. The safety door 302B should be kept closed to prevent operators from touching the mold 100A as it intermittently moves. The controller 42B stops the injection molding process when the safety door 302B is opened.

In another exemplary embodiment, the controller 42A/42B causes the alert device 350A/350B to issue a warning in response to the controller 42A/42B detecting opening of both the conveyor door 302A/302B and the mold door 390A/390B on the same side of the IMM2 while the injection molding with the mold 100A/100B inserted from the same side is performed. This warning can be issued in addition to stopping the insertion or the injection molding process as described above.

In still yet another embodiment, the mold door 390A/390B is open/closed manually and the injection molding system 1 can include a sensor that detects open/close states of the mold door 390A/390B. The mold door 390A/390B on one side of the IMM2 should be kept closed while the injection molding is performed with the mold 100 A/100B inserted from the other side of the IMM2.

In a case where conveyor apparatus 3A has ejected the mold 100A and the conveyor apparatus 3B has inserted the mold 100B, the mold door 390B should be opened because the conveyance unit 31B is linked with the mold 100B via the connection member 3020B. The mold door 390A should be kept closed for the operators' safety because in a situation where the mold 100A has already been ejected, the operators can unload the mold 100A and prepare another mold. If the mold door 390A is opened while the injection molding in the IMM2 is being performed with the mold 100B, the controller 41 detects that the mold door 390A is open, and in response to the detection, the controller 41 stops the injection molding. In this situation, even if the injection molding has not yet started, the controller 41 does not enable the IMM2 to start the injection molding with the mold 100B. The injection molding with the mold 100B is prohibited because an operator can be hit by moving components in the IMM2 if the opening 60A is exposed.

Controller 41, 42A/42B can also prohibit the conveyance of the mold 100A/100B while the mold door 390A/390B on the other side is opened because there is a possibility that an operator can touch the mold 100A/100B when the mold 100A/100B is about to move or is moving. When the mold 100A/100B has already been conveyed by the conveyor apparatus 3A/3B, the conveyance is stopped if the mold door 390A/390B is opened. When the mold 100A/100B has not yet been moved, starting the conveyance will be prohibited by the controller 41, 42A/42B if the mold door 390A/390B is opened. In another embodiment, the injection molding system 1 may allow conveyance of the mold 100A/100B, but issuance of an alert can occur as described below.

In another exemplary embodiment, the mold door 390A/390B is closed or opened by an actuator controlled by the controller 41. In this exemplary embodiment, when injection molding with the mold 100B is performed after the mold 100A is ejected, the mold door 390A is forced closed after the mold 100A has been ejected. This improves the operators' safety during unloading/exchanging of the mold 100A.

In another exemplary embodiment in which the mold door 390A/390B is open/closed manually, the injection molding system 1 can include a sensor that detects open/close states of the mold door 390A/390B. The alert device 350A can issue an alert or warning in a case where (1) the mold 100A has been ejected to the conveyor apparatus 3A, (2) injection molding is being or is about to be performed with the mold 100B, and (3) the mold door 390A/390B is open. The alert makes operators aware that the mold door 390A/390B is open while injection molding is performed, and contributes to the operators' safety. The alert can be stopped when the mold door 390A/390B is closed, when the injection molding system 1 detects that the mold replacement or mold unloading process is completed, or when the injection molding system 1 determines that there is no operator in the region surrounded by the safety walls 301A/301B and the IMM2 based on a sensor that detects presence of operators.

In the present embodiment, temperature controllers 321A/322A/321B/322B for the molds 100A/100B are provided and fixed at the frame 30A/30B of the conveyor apparatus 3A/3B. The temperature controllers 321A/322A/321B/322B include an interface with a hose 331A/332A/331B,332B, which connect to an interface on the molds 100A/100B, which is connected with a pipe (not illustrated) located internal to the molds 100A/100B. By circulating fluid, measuring the temperature of the fluid and feed-back controlling temperature of the fluid in the hose 331A/332A/331B/332B and the pipe, the temperature controllers 321A/322A/321B/322B raise or lower the temperature to set an internal temperature of the molds 100A/110B.

In still yet another exemplary embodiment, the controller 41 or the conveyor controller 42A/42B controls closing/opening the mold door 390A/390B. In this exemplary embodiment, in a situation where injection molding with the mold 100B is performed after the mold 100A is ejected, the mold door 390A is forced to be closed after the mold 100A has been ejected. This improves operators' safety while unloading/replacing the mold 100A.

The temperature controllers 321A/322A/321B/322B can control the temperature of the molds 100A/100B while the injection molding is performed in the IMM2, as well as while the molds 100A/100B are placed on the conveyor apparatus 3A/3B, and even after a predetermined set of molding processes is completed. For example, while the molds 100A/100B are loaded on the conveyor apparatus 3A/3B and are ready to be inserted into the IMM2, the temperature controller 321A/322A.321B/322B can start raising the temperature of the molds 100A/100B. This enables the molds 100A/100B to quickly reach the appropriate temperature for receiving melted resin, which contributes to reducing cycle time and increasing productivity. Because the molds 100A/100B are moved by the conveyor apparatus 3A/3B instead of operators, raising the temperature of the molds 100A/100B outside the IMM2 does not necessarily affect operator safety.

The temperature controller 321A/321B/322A/322B can start lowering the temperature of the molds 100A/100B after a predetermined set of molding processes is completed and while the molds 100A/100B are waiting to be ejected to the conveyor apparatus 3A/3B. By actively lowering the temperature of the molds 100A/100B, operators can start unloading the molds 100A/100B more quickly, which contributes to shorter setup time for a new mold.

The temperature controllers 321A/321B/322A/322B can be located external to the conveyor area. If they are external to the conveyor area, operators can start/stop raising/lowering a mold's temperature without having to enter the conveyor area.

In the exemplary embodiment, both the fixed mold 101 and the movable mold 102 of the molds 100A/100B are provided with the hose 331A/331B/332A/332B. In a different exemplary embodiment, one temperature controller can cover both the fixed mold 101 and the movable mold 102.

Figure 6:
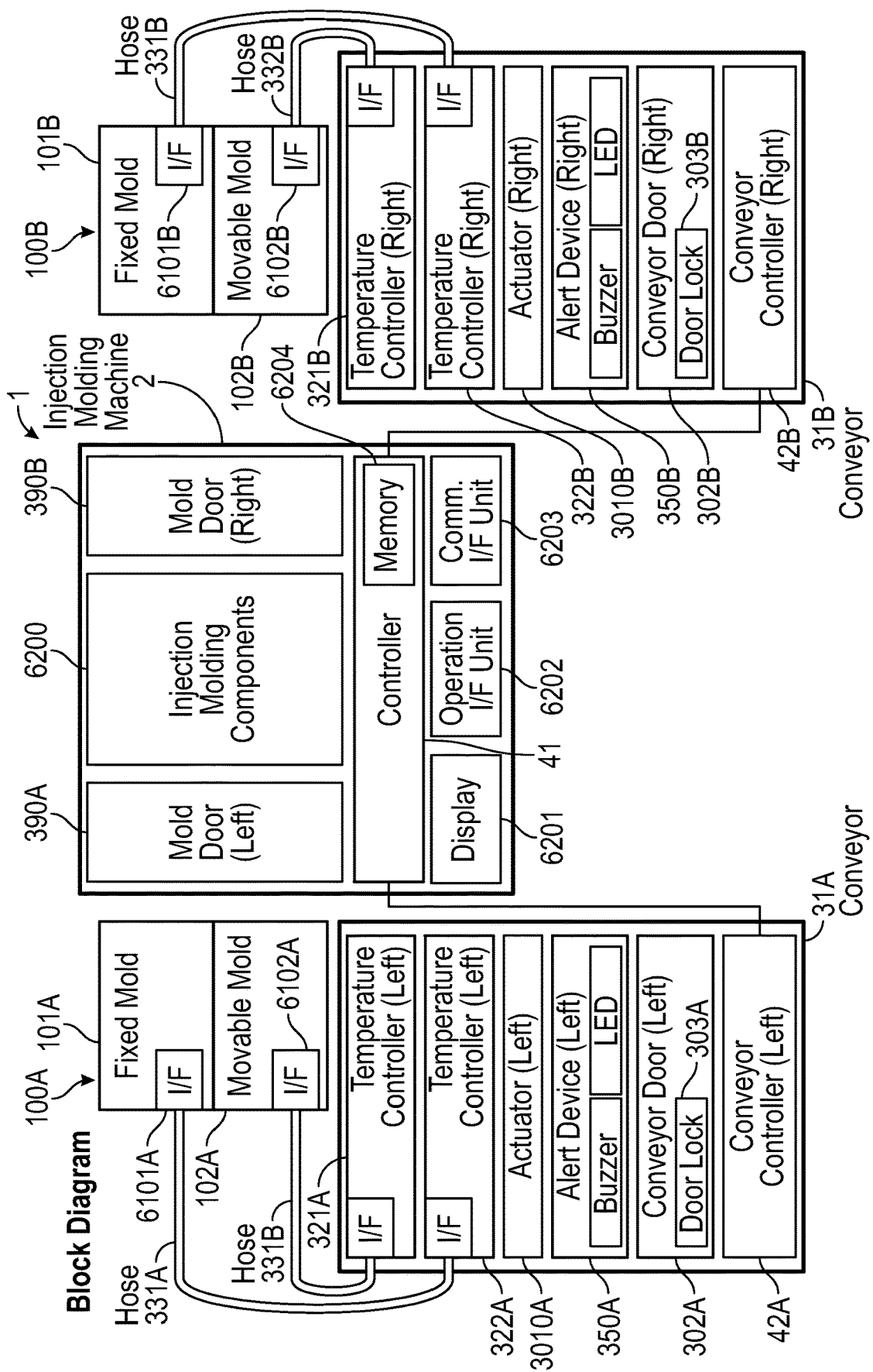
FIG. 6 is a block diagram illustrating relationships between components of the injection molding system according to an exemplary embodiment.

FIG. 6 is a block diagram illustrating relationships between components of the injection molding system 1 according to the exemplary embodiment and provides an improvement over elements illustrated in FIG. 20. The same reference numbers associated with components previously described are applicable to components in the following description and in some instances, these components may not be described in detail below.

The IMM2 includes the mold door 390A on the left side, which is the same side as the conveyor apparatus 3A, mold door 390B on the right side, which is the same side as the conveyor apparatus 3B. injection molding components 6200, which includes the injecting apparatus 5, the clamping apparatus 6, and the take-out robot 7, the controller 41, a display 6201, an operation interface 6202 such as buttons or a touch panel module integrated into the display 6201, and a communication I/F 6203 such as USB, Ethernet, and/or other wired/wireless interfaces.

The controller 41 includes a memory 6204 that stores molding conditions for performing injection molding with a specific mold, states of components in the injection molding system 1, along with other applicable data items. The memory 6204 also stores a program including instructions executed by the controller 41 to perform injection molding and processes described in the present disclosure. The display 6201 is controlled by the controller 41, and can display various information of the injection molding system 1, including states of the components, molding conditions stored in the system, scheduled molding tasks, alert information related to the injection molding system 1, etc.

In the exemplary embodiment, the display 6201 and the controller 41 work in combination as an alert device of the IMM2. In another exemplary embodiment, the display 6201 and the controller 41 work in combination as an alert device of the entire injection molding system 1, including the IMMS2, the conveyor apparatus 3A, the conveyor apparatus 3B, etc.

The operation interface 6202 receives user inputs to trigger various functions like powering on/off the IMM2, starting, pausing, resuming, ending, etc., the injection molding process, displaying the states of the various components of the injection molding system 1, etc. The controller 41, based on the received inputs, initiates the function associated with the particular input. The communication interface 6203 receives and/or sends data such as states of the components, molding conditions, log data of the injection molding system 1, etc.

While not illustrated in FIG. 6, temperature sensors and position detection sensors are located in the IMM2. The sensors are connected to the controller 41 and information provided by the sensors can also be used as inputs to trigger various functions of the injection molding system 1.

The mold 100A/100B includes a fixed mold 101A/101B, a movable mold 102A/102B, a hose connector 6101A/6101B in the fixed mold 101, and a hose connector 6102A/6102B in the fixed mold 102. The hose connector 6101A/6101B connects to a hose 331A/331B and the hose connector 6102A/6102B connects to a hose 332A/332B.

In the exemplary embodiment, the connectors 6101A/6101B and 6102A/6102B are on the side surface of the mold 100A/100B, which faces away from opening 60A/B of the IMM2, when the mold is on the conveyor 3A/3B as illustrated in FIG. 5. The mold door 390A/390B is kept in an open position when the injection molding is performed in the IMM2 with the mold 100A/100B.

The conveyor apparatus 3A/3B includes the conveyance unit 31A/31B, the alert device 350A/350B, temperature controllers 321A/321B and 322A/322B, which include connectors to hoses 331A/331B and 332A/332B, a conveyor door 302A/302B including a door lock 303A/303B, and a conveyor controller 42A/42B. The controller 42A can control all of these components. The controller 42A/42B is connected to the controller 41 and sends and/or receives information to synchronize operation of the conveyor apparatus 3A/3B and the IMM2.

FIG. 7 is a chart illustrating various states defined for components of the injection molding system 1. These states are not seen to be limiting, and any additional states that would enable practice of the exemplary embodiment are applicable. The states are monitored, the state information stored in the memory 6204, and the controller 41 controls the components based on the stored state information. As previously described, the controller 41 changes or updates the states of components based on user inputs as well as sensor inputs. In another exemplary embodiment, the state information is stored in the controller 42A/42B.

As an example, states associated with the IMM2 include 'Idle', 'Preparing' for the next injection molding process, 'N-th molding being performed', 'mold ejection ready (left/right)', and 'mold insertion ready (left/right)'. In the 'Idle' state, the IMM2 waits for the next molding condition(s). When the IMM2 receives the molding condition(s) the IMM2 transitions to the 'Preparing' state, where the IMM2 prepares for the injection molding. The molding condition(s) typically includes the number of times the injection molding repeats, and, after injection molding starts, if the number is N currently, the IMM2 state becomes 'N-th molding being performed'. The state is updated every time one cycle of the injection molding process finishes. After a predetermined number of cycles is completed, and at least after the clamping apparatus 6 releases the mold and the nozzle 52 of the injecting apparatus 5 is moved away from the mold, the IMM2 transitions to 'mold ejection ready(left/right)' state.

There are a number of conditions that can cause transition to the 'mold ejection ready (left/right)' state. For example, the conditions can include (i) the mold door 390A/390B is open, (ii) the conveyance unit 31A/31B is working properly and no errors have issued, (iii) the conveyor door 302A/302B is closed, and/or (iv) no mold is placed on the conveyor 3A/3B. The injection molding system 1 determines the existence of these conditions based on signals received from the above-described sensors.

In one exemplary embodiment, a mechanical or electronic switch in the injection molding system 1 is connected to the controller 41, 42A/42B. The switch is operated when it is confirmed that the injection molding system 1 is ready for ejection of the mold 100A/100B. The switch can be used to force transition to the 'mold ejection ready (left/right)' state, or the switch can be used as one of the conditions in combination with the above-described conditions or other conditions.

After the ejection of the mold, the IMM2 prepares for the next injection molding using a different mold. When the preparation completes, the IMM2 changes the state to 'mold insertion ready (left/right)'. The preparation includes adjustment of the movable platen 62.

There are a number of conditions that can cause transition to the 'mold insertion ready(left/right)' state. For example, the conditions can include (i) the mold door 390A/390B is open, (ii) the conveyance unit 31A/31B is working properly and no errors have issued, (iii) the conveyor door 302A/302B is closed, and/or (iv) no mold is placed in the IMM2.

The mold door 390A/390B includes 'closed-locked', 'closed-unlocked', and 'open' states. These states are monitored/detected by sensors (not illustrated) located on the mold door 390A/390B or on one of the safety walls 301A/301B.

The mold 100A/100B includes 'placed on a conveyor—not ready', 'placed on a conveyor—ready', 'being inserted', 'being ejected' 'in an injection molding machine/not on a conveyor' states. In one exemplary embodiment, these states are monitored/detected by sensors (not illustrated) located on the conveyor apparatus 3A/3B. In another exemplary embodiment, user inputs change the state.

In one example, a sensor located on the conveyor 3A/3B detects whether the mold 100/100B is on the conveyor apparats 3A/3B, along with a connection/disconnection state of the hoses 331A/331B and 332A/332B. An operator can confirm other injection molding preparation steps. When an operator confirms completion of the other preparation steps, the user pushes a button located on the conveyor apparatus 3A/3B. If the mold 100/100B is detected, the connection state is detected, and the button is pressed on, the state of the mold 100A/100B transitions from 'placed on a conveyor—not ready', to 'placed on a conveyor—ready'.

The conveyance unit 31A/31B includes 'Home position', 'Inserting mod', 'Ejecting mold', and 'mold in injection molding machine' states. These states are monitored/detected by sensors (not illustrated) located on the conveyor apparatus 3A/3B. "Home position" is a where the connection member 3020A/3020B is pulled back, and the mold 100A/100B attached to the distal end of the connection member 3020A/3020B is outside the IMM2. When the state transitions from "Home position" to 'Inserting mold', the actuator 3010 pushes the connection member 3020A/3020B in the direction of the IMM2. When the mold 100A/100B is completely inserted into the IMM2 and its movement stopped, the state transitions to 'Mold in injection molding machine'. After the injection molding process completes, the state transitions to 'Ejecting mold' and the actuator 3010 pulls the connection member 3020A/3020B and the mold 100A/100B out from the IMM2.

Both the temperature controllers 321A/321B and 322A/322B include '$1^{st}$ temperature (low); ready for mold change', 'Raising mold temperature', 'Lowering mold temperature' and '$2^{nd}$ temperature(high) ready for molding' states. When the hoses 331A/331B and 332A/332B connect to the connectors 6101A/6101B and 6102A/6102B, and an operator starts the temperature controllers 321A/321B and 322A/322B, the state transitions to 'Raising mold temperature'. In this state the temperature controller 321A/321B and 322A/322B raises the temperature of the mold 100A/100B to the $2^{nd}$ temperature. The $2^{nd}$ temperature is a temperature high enough for injection molding.

If the mold 100A/100B reaches the $2^{nd}$ temperature, the state transitions to '$2^{nd}$ temperature(high) ready for molding'. Upon completion of the injection molding, the state transitions to 'Lowering mold temperature', where the temperature controller 321A/321B and 322A/322B begin lowering the temperature of the mold 100A/100B to the $1^{st}$ temperature. This is a temperature low enough for an operator to touch the mold 100A/100B to unload the mold 100A/100B. When the mold reaches the $1^{st}$ temperature, the state transitions to '$1^{st}$ temperature(low) ready for mold change'. The temperature is monitored by temperature sensors (not illustrated) located in the mold 100A/100B and/or in the temperature controllers 321A/321B and 322A/322B. The temperature sensors periodically send temperature information to the controller 41 and/or 42A/42B.

The alert device 350A/350B includes 'Idle', 'Exchange Ready(unload notice)' 'being inserted', 'being ejected', 'Advance warning(insertion)' and 'Advance warning(ejection)' states. When the state is 'Idle', the alert device 350A/350B does not issue any alerts, and can illuminate an LED, for example, a green LED to indicate this. When the state of the mold 100A/100B is 'Placed on conveyor—ready' and the state of the IMM2 is 'Mold Insertion Ready (left/right)', the state of the alert device 350A/350B transitions to 'Advance warning(insertion)'. In this state, the alert device 350A/350B issues a warning for a predetermined amount of time and illuminates an LED, for example a red LED, and/or provides a continuous sound via a speaker as the warning. The warning notifies operators that the conveyance unit 31A/31B is about to move the mold 100A/100B. Upon beginning of movement of the mold 100A/100B, the state transitions to 'being inserted'. In this state, the alert device 350A/350B issues a warning by blinking an LED, i.e., red LED, periodically and/or by issuing intermittent sounds.

Upon completion of the injection molding with the mold 100A/100B, the state transitions to 'Advance warning(ejection)'. In this state, the alert device 350A/350B issues a warning for a predetermined amount of time by, for example, a red LED and/or by providing a continuous sound via a speaker. The warning notifies operators that the conveyance unit 31A/31B is about to move the mold 100A/100B into the IMM 2. Upon the beginning of movement of the mold 100A/100B, the state transitions to 'being ejected'. In this state, the alert device 350A/350B issues a warning by blinking an LED, e.g., red LED, and/or by issuing intermittent sounds.

After the mold 100A/100B is ejected and the temperature controllers 321A/321B and 322A/322B are both in the '$1^{st}$ temperature (low); ready for mold change' state, the state of the alert device 350A/350B transitions to 'Exchange ready (unload Notice)'. In this state, the alert device 350A/350B informs operators that the mold 100A/100B is ready for unloading by issuing a sound or lighting an LED.

The visual and audible warnings in the 'being inserted' state can be different from those in the 'Advance warning (insertion)' so that operators can easily distinguish between states. The visual and audible warnings in the 'being ejected' state can be different from those in the 'Advance warning (ejection)' state so that operators can easily distinguish between states. The visual and audible warnings in the 'being inserted' state can be different from those in the 'being ejected' state so that operators can easily distinguish between states.

The warnings for the conveyor apparatus 3A can be different from those for the conveyor apparatus 3B so that the operator can easily recognize, based on the different warnings for each conveyor apparatus, which conveyor apparatus needs attention.

FIG. 8A is a chart illustrating a set of molding conditions for a single injection molding. The molding conditions include conditions that can include one or more sub-conditions. The conditions or sub-conditions have a data type, such as 'Integer', 'Short/Long/Double', 'Boolean', 'Text' or 'Variables', which is a combination of 'Integer', 'Boolean' and 'Text'. The molding conditions include a number of conditions, such as a condition ID, a mold ID, a number of shots, and injection molding conditions. The conditions, sub-conditions, and data types provided in FIG. 8A are not limiting, and any condition, sub-condition, and/or data type that would enable practice of the present disclosure is applicable.

The condition ID is an identifier of the molding conditions. The mold ID is an identifier of the mold used in the injection molding. The mold ID correlates to various mold related parameters including, but not limited to, the thickness of the mold, which is used to adjust the movable platen 62 to accommodate the mold. The number of shots defines the number of times the IMM2 repeats the injection molding.

The injection molding conditions includes various sub-conditions, including but not limited to, clamping conditions for the clamping apparatus 6, injection conditions for the injecting apparatus 5, pressure holding conditions, cooling conditions, opening conditions for the clamping apparatus 6, and molded-part-ejection conditions for the take-out robot 7. The mold conditions can also include a cycle time that is the average or standard time of one cycle of injection molding, and cooling time that is the minimum time that the mold should be cooled.

The average preparation time is the time that operators need for preparing the mold. The average unload time is the time that operators need for unloading the mold. These time related data items can be incorporated into the molding conditions and can be updated through the daily injection molding processes. They can be used to schedule the injection molding tasks. The molding conditions can be displayed on a display 6201 by the controller 41. The molding conditions can be manually updated via the operation interface 6202, automatically by the controller 41, and/or updated by receiving updated conditions via the communication I/F 6203.

FIGS. 8B and 8C illustrate additional information that can also be included in the molding conditions. In the exemplary embodiment the molding task list illustrated in FIG. 8B is stored in the memory 6204 of the controller 41. In another exemplary embodiment, the molding task list can be stored in an external computer connected to the controller 41 via the communication I/F 6203. In this exemplary embodiment, multiple molding task lists for multiple injection molding systems can be stored in the external computer connected to the multiple injection molding systems via a network, and the external computer performs centralized control for all of the injection molding systems. The injection molding system(s) periodically sends status information of molding tasks so that operators are provided the statuses of all of the molding tasks without needing to check the display 6201 at the injection molding system itself. The injection molding system 1 can send the states illustrated in FIG. 7 to the external computer via the communication I/F 6203 enabling the operator to check the states from the external computer FIG. 8B illustrates a list of injection molding tasks stored in the memory 6204. The data includes, but is not limited to, "Molding", "Status", "Est. Total Time", "Est. Time To Complete".

"Molding": defines a set of molding conditions as illustrated in FIG. 8A. "Status" indicates a current status of injection molding, where the status includes, but is not limited to 'Not Scheduled Yet' (indicates the task is stored but not yet scheduled), 'Waiting' (indicates that the injection molding task is scheduled and waiting to be performed), 'Prepared; Ready for Insertion' (indicates that the mod is ready and on the conveyor apparatus 3A/3B, but molding task has not yet been performed), 'Molding performed' (indicates that the injection molding is being performed), and 'finished' (indicates that the molding task is completed.

The estimated total time of the molding task is represented by 'Est. Total Time'. This can be estimated by multiplying the cycle time and the number of shots, if both items are included in the molding conditions. The 'Est. Total Time' can also be obtained manually.

The estimated time to complete the molding task is represented by 'Est. Time to Complete'. This time can be estimated by the following equation:

$$T\_est\_time\_to\_complete = T\_est\_total\_time - \{T\_cycle\_time \times (N\_shots - N\_current)\},$$

where "T_est_time_to_complete" is the 'Est. Time to Complete', "T_est_total_time" is the 'Est. total time', "T_cycle_time" is the cycle time, "N_shots" is the number of shots, which can be obtained from the molding conditions or from manual inputs. "N_current: is the current number of shot being performed, which can be obtained from the IMM2, as obtained for updating the state 'N-th molding being performed' of the IMM2. The 'Est. Time to Complete' can also be manually obtained via the operation interface 6202 or obtained from the communication I/F 6203.

When a molding task is finished, the actual total time of the task, the actual average cycle time, the actual mold setup time and/or the actual unload time can be recorded and stored in the memory 6202 by the controller 41, and can be sent to an external storage via the communication I/F 6203 by the controller 41. The controller 41 can use these items of actual time information to update the items of time information in the molding conditions.

The statuses in FIG. 8B are repeatedly updated based on the component(s) states (illustrated in FIG. 7). For example, the status can change from 'waiting' to 'Prepared; Ready for Insertion', when the state of temperature controllers 321A/321B and 322A/322B is 'Raising mold temperature' or '$2^{nd}$ temperature (high) ready for molding'. The status can change from 'Prepared; Ready for insertion' to 'Molding Performed' when the state of the IMM2 is 'N-th molding being performed'.

FIG. 8C illustrates a queue of molding tasks scheduled to be performed that are in the "Waiting" status. While the molding task list includes the molding tasks including completed tasks and unscheduled tasks, this queue includes tasks scheduled to be performed. In the exemplary embodiment, a molding task can be added to the queue upon receiving the molding task or the molding conditions. Because the order of performing molding tasks can be critical to productivity, the order of the molding tasks in the queue can be manually updated via the operation interface 6202. The molding tasks in the queue can be manually added or deleted or automatically via updates received from the communication I/F 6203.

In another exemplary embodiment the control 41 or an external computer that communicates with the controller 41 via the communication I/F 6202 can determine the order of the molding tasks in the queue. The order of the tasks can be determined based on the cycle times, average setup times, and average unload times of molding tasks.

FIG. 9A is a flowchart illustrating a process of the injection molding system 1 performing injection molding. When an operator powers on the injection molding system 1, the controller 41 starts an initialization process (S901) to prepare for accommodating a mold and for performing the injection molding. The initialization process initializes the injection molding components 6200. The initialization process can also include an initialization process of the conveyor apparatuses 3A and 3B, which includes the initialization of the conveyance units 31A and 31B.

Figure 10:
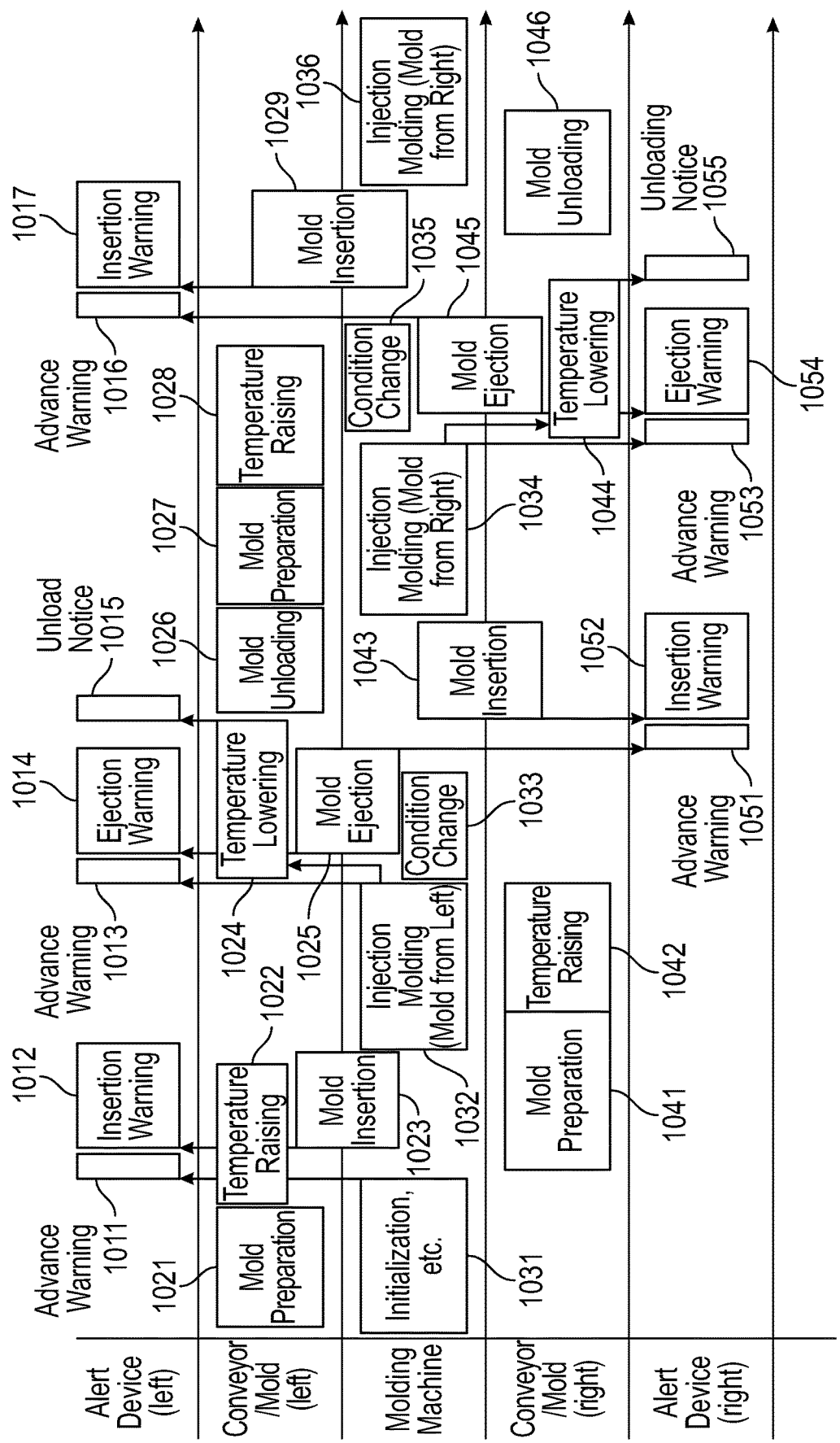
FIG. 10 illustrates multiple mode options including normal sequential molding according to an exemplary embodiment.

After initialization, the controller 41 sets a molding mode (S902) from among available mode options. The present injection molding system 1 includes multiple mode options including normal sequential molding as illustrated in FIGS. 10, 11, and 25, parallel molding as illustrated in FIG. 26, and their combination illustrated in FIG. 27. In normal sequential molding mode, the injection molding is performed with a single mold at a time in the IMM2. Operators perform the injection molding, mold unloading, and mold setup at the conveyor apparatus 3A/3B.

Once the injection molding is completed, the mold is ejected from the IMM2 by the conveyor apparatus 3A/3B, a new mold is inserted by the conveyor apparatus 3A/3B. The next injection molding with the new mold then starts. While the next injection molding is performed, the previously ejected mold is unloaded and a new mold is loaded onto the conveyor apparatus 3A/3B.

In a parallel molding mode, two molds are used in the IMM2 in parallel. For example, after injection of a melted resin into the mold 100A and after pressure holding, the mold 100A is ejected to the conveyor apparatus 3A by the conveyance unit 31A, where cooling process of the mold 100A is performed on the conveyor apparatus 3A. In parallel to the ejection and the cooling process of the mold 100A, the mold 100B is inserted into the IMM2 from the conveyor apparatus 3B by the conveyance unit 31B.

The IMM2 opens the mold 100B and ejects the molded part from the mold 100B and then injection and pressure hold of the next cycle is performed. The mold 100B is then ejected to the conveyor 31B, where the cooling process is performed. While cooling process of a mold is performed external to the IMM2, opening, ejecting a molded part, and injection and pressure hold of a next cycle is performed internal to the IMM2. Details of the above-described modes are described below.

Because in a normal sequential molding mode mold setup can be performed for one mold while the injection molding is performed with another mold, the normal sequential molding mode can be preferable for performing molding tasks in which the number of shots are relatively small and mold unloading and setup are performed relatively frequently. This mode can also be preferable for performing molding tasks where the estimated total time of one injection molding task is similar to or greater than a sum of the previous molding task unloading time and the setup time of the next molding task.

Because in the parallel molding mode, a cooling process of one mold is performed while the other processes of another mold are performed, the parallel molding mode can be preferable to perform molding tasks where the number of shots are relatively large. The parallel molding mode can also be preferable for performing molding tasks where cooling time of one mold is similar to the time of the other processes of another mold. A mode option of a combination of these two modes is described below with respect to FIG. 27.

After setting the molding mode, the controller 41 loads molding conditions (S903) in the molding queue, as illustrated in FIG. 8C, that are stored in the memory 6204. The controller 41 then selects one or more molding conditions (S904) for the next injection molding from the queue.

The controller 41 loads the selected set of molding conditions and sets up the IMM2 for the next injection molding. The controller 41 then performs injection molding (S905) with the inserted mold from the conveyor apparatus 3A/3B. When the injection molding of the selected molding conditions is completed, the controller 41 checks the queue to determine any molding conditions (S906) still exist. If there is still any, (N in S906), the process returns to S904 to select one or more molding conditions. If no more exist(Y in S906), the controller 41 finalize the process (S907) and sets the IMM2 to the 'Idle' state. When the parallel molding mode is selected in step S902, two sets of molding conditions are selected by the controller 41 in step S904, and in step S905 the IMM2 performs injection molding with two molds in parallel.

In another exemplary embodiment, steps S902 (setting molding mode) and S903 (loading molding conditions) can be performed in parallel to step S901 initialization). In yet another exemplary embodiment, the molding mode can be set for each of the molding tasks. In this exemplary embodiment, step S902 (setting molding mode) is performed as a part of step S904 (selecting one or more molding conditions).

FIG. 9B is a flowchart illustrating processes performed by the controller 41 to update the molding task list and the molding queue illustrated in FIGS. 8B and 8C. These processes are performed in parallel to the process illustrated in FIG. 9A.

After power is turned on, the controller 41 repeatedly checks for receipt of new molding conditions (S951). The new molding conditions can be manually input via the operation interface 6202, can be provided from an external computer, and/or can be obtained from a storage via the communication I/F 6203.

If new molding conditions are received (Y in S951), the controller 41 creates data of a new molding tasks corresponding to the new molding conditions, stores the new molding conditions in the memory 6204, and adds a new record for the new molding conditions to the molding task list (S952). Then the controller 41 schedules the molding task by adding it to the queue, as illustrated in FIG. 8C. In the exemplary embodiment, the controller 41 adds the new task to the bottom of the queue. In another exemplary embodiment, the controller 41 arranges the order of the queue based on the molding conditions of the molding tasks in the molding task list. If in step S951, if new molding conditions are not received, the process proceeds to step S954.

In one example, if the controller 41 determines that a pair of molding tasks A and B have cycle times is similar to or shorter than the setup time of the other molding task, the controller 41 rearranges the molding tasks in the queue so that the molding tasks A and B are adjacent in the queue. In another example, if the controller 41 determines molding tasks A, B, and C all have at relatively small number of shots, the controller 41 rearranges the molding tasks A, B and C in ascending order of the number of shots.

In another exemplary embodiment, the molding mode can be set to each of the molding tasks, and if the controller 41 determines a pair of molding tasks C and D, where the molding task C's cooling time is approximately the same as the molding task D's time of other processes than the cooling time, the controller 41 arranges the molding tasks C and D in this order in the queue. The controller 41 also sets the molding mode of the molding task C and D as parallel molding to each other.

Returning to FIG. 9B, in step S954, the controller 41 determines if an input is received for modifying the queue. The input can be received via the operation interface 6202, from an external computer, or from a storage via the communication I/F 6203. If the input is received (Y in S954), the controller 41 modifies the queue based on the input (S955). The process then proceeds to step S956. If no input is detected (N in S954), the process proceeds to step S956.

In step S956, the controller 41 determines if an input for powering off the injection molding system 1 or if an input for transitioning the injection molding system 1 to a power saving mode has been received. If an input is received (Y in S956), the controller 41 saves all of the information in the memory 6204, and finalizes the process (S957). If no input is received, then the process returns to the step S951.

FIG. 10 is a timing chart illustrating exemplary processes in some components of the injection molding system 1 in the normal sequential molding mode. How the processes of components are performed in parallel is described below. The horizontal axis indicates a time line from left to right in the chart. Some processes can be performed by the components, while others can be manually performed.

In this exemplary processes power to the IMM2 is turned on, the mold 100A is prepared on the conveyor apparatus 3A, and the mold 100B is prepared on the conveyor apparatus 3B.

The IMM2 performs initialization (Initialization etc. 1031), as described above with respect to step S901. The initialization process 1031 also includes the controller 41 setting a molding mode (S902), loading molding conditions (S903), and selecting a molding condition (S904). In the initialization process 1031 the IMM2 adjusts the movable platen 62 to accommodate the mold 100A/100B, based on the mold thickness information associated with the mold ID.

In the present exemplary processes, the mold 100A is prepared at the conveyor apparatus 3A (Mold Preparation 1021). The hoses 331A and 332B are connected to the connectors 6101A and 6102A, and then the temperature controllers 321A and 322A begin raising the temperature of the mold 100A (Temperature Raising 1022). Upon completion of the initialization process 1031, the alert device 350A issues an advance warning (advance warning 1011), for a pre-determined period of time in advance of the actual mold insertion. Because the Temperature Raising 1022 can be performed while the mold 100A is on the conveyor apparatus 3A or while the mold 100A is in the IMM2, in the present exemplary processes the Temperature Raising 1022 is performed in parallel to the advance warning 1011.

In another exemplary embodiment, the advance warning 1011 can be issued in response to the mold 100A reaching a third temperature T3, which is less than or equal to the second temperature. The advance warning 1011 is to inform operators that the temperature of the mold 100A is such that the mold 100A should not be touched.

After the advance warning 1011, the conveyance unit 31A inserts the mold 100A into the IMM2 (Mold Insertion 1023). In parallel, the alert device 350A issues a warning (insertion warning 1012) to inform the operators that the mold 100A is being inserted and to remain away from the conveyance unit 31A and the mold 100A. After the mold insertion is completed, the IMM2 performs the injection molding with the inserted mold 100A (Injection Molding 1032).

After the Mold Preparation 1021 and while the Injection Molding 1032, the mold 100B is prepared at the conveyor apparatus 3B (Mold Preparation 1041). The temperature controllers 321B and 322B raise the temperature of the mold 100B (Temperature Raising 1042) by running fluid through the hoses 331B and 332B connected to the mold 100B.

In response to completion of the Injection Molding 1032, the alert device 350A issues an advance warning (advance warning 1013) for a pre-determined period of time in advance of the actual ejection of the mold 100A. In response to completion of the Injection Molding 1032, the temperature controllers 321A and 322A start lowering the temperature of the mold 100A (Temperature lowering 1024) to accelerate the temperature drop. After the advance warning 1013, the conveyance unit 31a starts ejecting the mold 100A (Mold Ejection 1025). During the Mold Ejection 1025, the alert device 350A issues a warning (ejection warning 1014) to inform operators that the mold 100A is being ejected to the conveyor apparatus 3A. After the Mold Ejection 1025 and the temperature of the mold 100A drops to the first temperature, the alert device 350A informs operators of the situation (Unload notice 1015) that the mold 100A can be touched and is ready to be unloaded. The mold 100A is then unloaded from the conveyor apparatus 3A (Mold Unloading 1026).

The process includes disconnecting the hoses 331A and 332A from the connector 6101A and 6102A, and unloading the mold 100A from the conveyor apparatus 3A. A new mold is prepared on the conveyor apparatus 3A (Mold Preparation 1027), and the temperature controllers 321A and 322A begin raising the temperature of the new mold (Temperature Raising 1028), as described-above for the mold 100A.

After the injection molding 1032, the IMM2 loads new molding conditions from the memory 6204 and changes the settings (Condition Change 1033), as described above with respect to step S904 after step S906. The Condition Change 1033 can partially performed in parallel to the Mold Ejection 1025.

In response to the Mold Ejection 1025, the alert device 350A issues an advance warning (advance warning 1051) for a predetermined period of time in advance to the actual insertion of the mold 100B. The conveyor apparatus 3B then begins inserting the mold 100B (Mold Insertion 1043). In parallel to the Mold Insertion 1043, the alert device 350B issues a warning (insertion warning 1052) notifying operators that the mold 100B is being inserted into the IMM2.

In another exemplary embodiment, the advance warning 1013 can be started a predetermined number of seconds before the injection molding is completed. The controller 42A can receive the estimated time to complete from the controller 41. The controller 42A, based on the received information, controls the alert device 350A to perform this process, which can improve overall productivity. The same process can also be applied to the alert device 350B.

In another exemplary embodiment, the advance warning 1051 can be started a predetermined number of seconds before the mold ejection is completed. The controller 42B stores the standard time of the mold ejection. The controller 42B, based on the standard time, controls the alert device 350B to issue this advance warning, which can improve overall productivity. The same process can also be applied to the alert device 350A.

During the Mold Unloading 1026, the Mold Preparation 1027, and the Temperature Raising 1028 the IMM2 performs injection molding with the inserted mold 100B (Injection Molding 1034).

After the Injection Molding 1034, similar processes as previously described are performed. After the Injection Molding 1034, the IMM2 changes molding conditions (Condition Change 1035). In response to the Injection Molding 1034, the alert device 350B issues an advance warning (advance warning 1053), the conveyor apparatus 3B ejects the mold 100B, and the alert device 350B issues a warning (ejection warning 1054). In addition, in response to the Injection Molding 1034, the temperature controllers 321B and 322B start lowering the temperature of the mold 100B (Temperature lowering 1044). In response to the temperature reaching the $1^{st}$ temperature, the alert device 350B notifies that the unloading is ready (unload notice 1055). The operators then begin unloading the mold 100B (Mold Unloading 1046).

After the Mold Ejection 1045, the alert device) 350A issues an advance warning (advance warning 1053), the conveyor apparatus 3A inserts a new mold into the IMM2 (Mold Insertion 1029), and the alert device 350A issues a warning (insertion warning 1017). After the Mold Insertion 1029 the IMM2 starts injection molding with the inserted new mold (Injection Molding 1036).

The components in the injection molding system 1 repeatedly perform the above-described processes to perform injection molding with multiple molds in the normal molding mode. For example, in the IMM2, the injection molding is performed for the mold 100A, then for the mold 100B, and then for a new mold. The IMM2 performs the injection molding with multiple molds sequentially.

In another exemplary embodiment, the alert device 350B can issue a warning when the temperature of the mold 100B reaches the third temperature in the Temperature Raising 1042. In this exemplary embodiment, the alert device 350B also issues the warning in addition to the advance warning 1051.

Figure 11A:
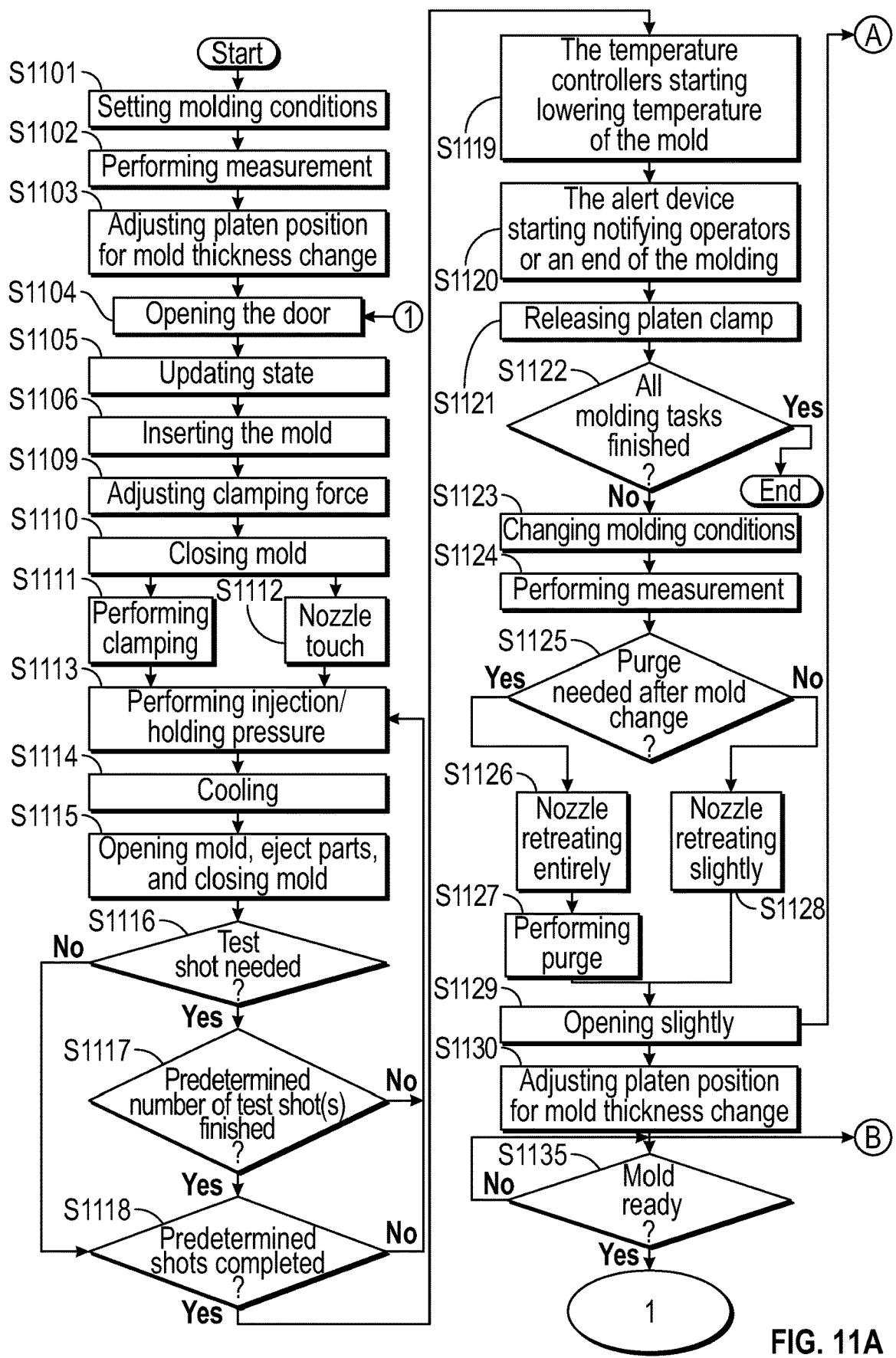
FIGS. 11A and 11B depict a flowchart illustrating a process of the injection molding system in the normal sequential molding mode according to an exemplary embodiment.
Figure 11B:
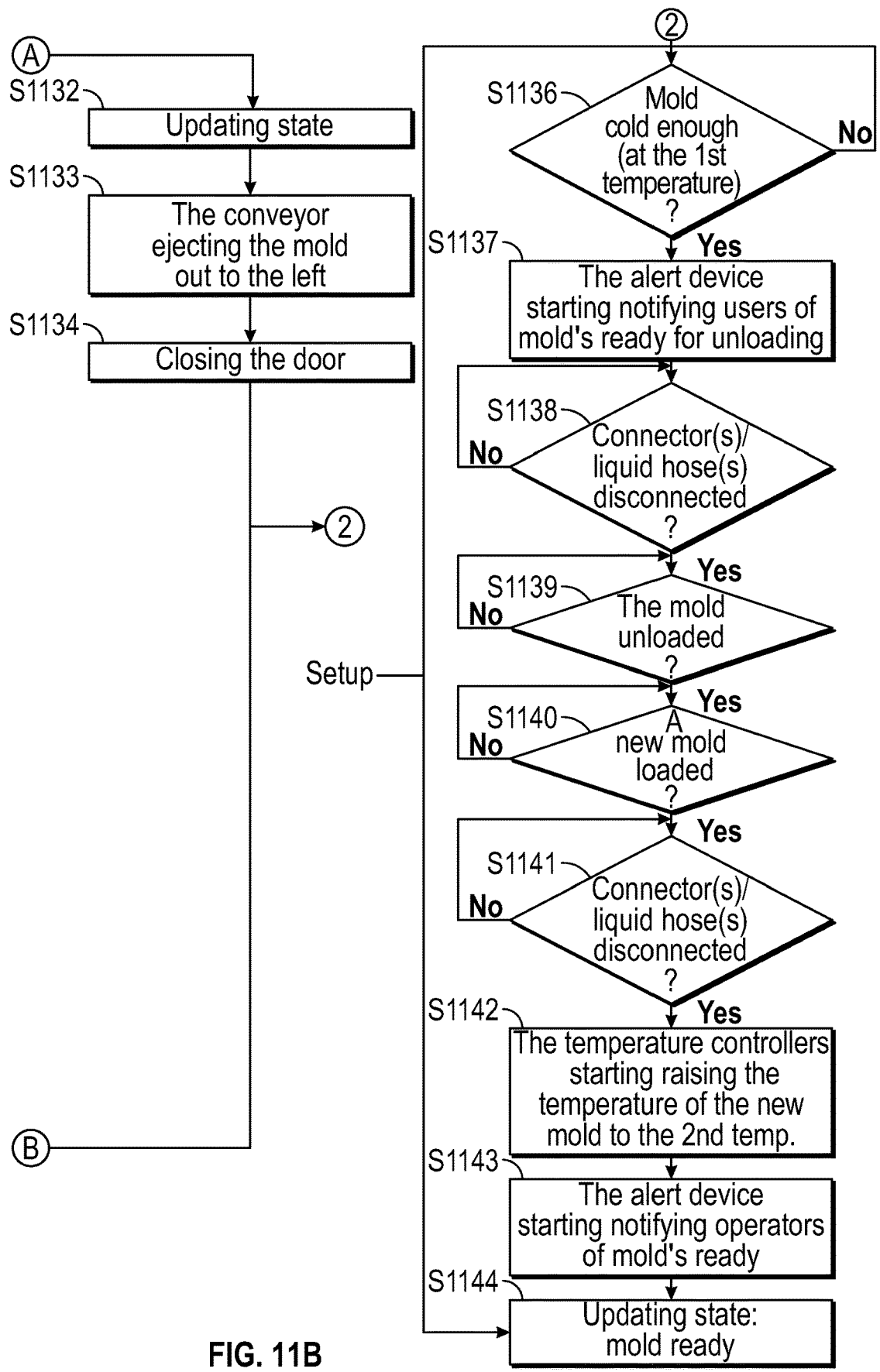

FIGS. 11A and 11B depict a flowchart illustrating a process of the injection molding system 1 in the sequential molding mode. The process corresponds to steps S904 through S906 in FIG. 9. The controllers 41, 42A and 42B control components in the injection molding system 1 to perform the process. In the process, the mold 100A is inserted into the IMM2 and is subject to injection molding. The mold 100B is then inserted and is subject to injection molding.

In step S1101 the controller 41 loads and sets molding conditions to the injection molding components 6200. In step S1102 the injecting apparatus 5 performs, based on the set molding conditions, measurement of melted resin to be injected into a mold. In step S1103, the clamping apparatus 6 adjusts a position of the movable platen 62 to accommodate the mold to be inserted into the IMM2. In another embodiment steps S1102 and S1103 can be performed simultaneously.

In step S1104 the controller 41 controls opening of the mold door 390A to enable the mold 100A to be inserted into the IMM2. The controller 41 then updates the state of the IMM2 to 'Mold Insertion Ready (left)' in step S1105. Steps S1101 through S1105 correspond to the Initialization, etc. 1031 in FIG. 10.

In another exemplary embodiment, the mold door 390A is manually opened and closed, and a sensor (not illustrated) located near the mold door 390A detects the open/close state of the mold door 390A. In step S1104, the controller 41 determines if the mold door 390A is opened. If the mold door 390A is determined to be opened, the process proceeds to step S1105.

In step S1106, the conveyance unit 31A inserts the mold 100A if the mold 100A has been prepared for insertion. If the mold 100A has not been prepared, the insertion of the mold 100A waits for the mold 100A to be prepared.

In yet another exemplary embodiment, the mold door 390A is manually opened and closed, and the conveyor apparatus 3A, the IMM2, or the injection molding system 1 include a button operated by an operator. The button is for receiving the operator's confirmation that the mold door 390A is opened and ready for mold insertion from the conveyor apparatus' 3A side. When the button is first operated, the controller 41 updates the state of the IMM2 to 'Mold Insertion Ready (left)'. In other words, the button triggers the start of conveying the mold. Any type of user interface other than button that can receive operator input to start the conveyor apparatus 3A to move the mold 100A is applicable.

Steps S1109 to S1118 correspond to Injection Molding 1032 in FIG. 10. In step S1109, the clamping apparatus 6 sets the clamping force to be applied to the inserted mold 100A. The clamping force is adjusted based on a mold to be used. In step S1110, the clamping apparatus 6 closes the mold 100A.

Steps S1111 and S1112 are then performed simultaneously. In step S1111, the clamping apparatus 6 clamps the fixed mold 101 and the movable mold 102 with the fixed platen 61 and the movable platen 62. In step S1112, the injecting apparatus 5 moves the nozzle 52 forward so that the tip of the nozzle 52 contacts a hole provided on the fixed mold 101 to receive melted resin.

In step S1113, the injecting apparatus 5 injects melted resin through the nozzle 52 into the cavity of the mold 100A. The clamping apparatus 6 also adjusts pressure inside the mold 100A to hold the pressure within an appropriate range. In response to of the start of step S1113, the controller 41 updates the state of the IMM2 to '$1^{st}$ molding being performed'. In step S1114, the controller 41 performs a cooling process. In this process, the controller 41 initiates a timer and periodically checks if the timer value reaches a predetermined cooling time. If the timer value reaches the predetermined cooling time, the cooling process is completed.

In step S1115, clamping apparatus 6 opens the mold 100A, the take-out robot 7 removes a molded part from the cavity of the mold 100A, and the clamping apparatus 6 closes the mold 100A. From steps S1113 to S1115, one cycle of injection molding is performed. The controller 41 has an Integer-type variable in the memory 6204 for counting the number of shots performed. Initially, the value of the variable is set to zero. Upon completion of step S1115, the controller 41 increments the value by one.

In steps S1116 through S1118, the controller 41 determines if a predetermined number of test shots and normal shots are completed. In step S1116, the controller 41 determines if any test shot is needed for the mold 100A. In this step, the controller 41 determines the current molding conditions loaded into the memory 6204 to determine if the current molding conditions include information regarding necessity of any test shot and the information is TRUE. If the information is TRUE, the controller 41 determines that at least one test shot is needed (Y in S1116) and the process proceeds to step S1117. If the information is not TRUE, the controller 41 determines that a test shot is not needed, and the process proceeds to step S1118.

In step S1117, the controller 41 determines if the predetermined number of test shots are finished. The controller 41 determines the variable for counting the number of shots performed in the memory 6024, and compares the value of the variable with the predetermined number of test shots in the molding conditions. If the predetermined number of test shots is greater than the variable, the controller 41 determines that the predetermined test shots is not yet finished (N in S1117). The process then returns to step S1113 to repeat the injection molding.

If the predetermined number of test shots is less than or equal to the variable, the controller 41 determines that the predetermined number of test shots are finished (Y in S1117). The process then proceeds to step S1118. In step S1118, the predetermined number normal shots are completed. The controller checks a value of the predetermined number of test shots (N_t), a value of the predetermined number of normal shots (N_n), and the variable for counting the number of shots completed (N_completed). The controller 41 compares N_completed with the value of 'N_t+N_n', and if the N_completed is smaller, the controller 41 determines that the predetermined number of shots are not completed yet (N in S1118). The process then returns to step S1113 to repeat the series of injection molding. If the N_completed is greater than or equal to the value of 'N_t+N_n', the controller 41 determines that the predetermined number of shots are completed (Y in step S1118), and the injection molding with the mold 100A is completed. The process then proceeds to step S1119.

In steps S1119 through S1135, the process for replacing a mold in the IMM2 is performed. In response to the completion of the injection molding with the mold 100A, the temperature controllers 321A and 322A starts lowering the temperature of the mold 100A for a quicker change of mold at the conveyor apparatus 3A. In S1120, the alert device 350A starts issuing a warning to notify completion of the injection molding with the mold 100A and that ejection of the mold 100A will soon be performed. Step S1120 corresponds to the advance warning 1013 in FIG. 10. In step S1121, the clamping apparatus 6 releases platen clamp of the mold 100A. In step S1122, the controller 41 determines if any molding task remains in the queue. If any molding tasks remain, the process proceeds to step S1123. If no molding tasks remain, the process ends.

In step S1123, the controller 41 selects new molding conditions for the next injection molding. In step S1124, the injecting apparatus 5 performs measurement of melted resin based on the new molding conditions. In step S1125, the controller 41 determines if a purge, i.e., removing/disposing of any residual resin remaining in the injection nozzle 52, is needed by checking the new set of molding conditions. If the controller 41 determines that the purge is needed (Y in S1125), the process proceeds to step S1126. If the controller 41 determines that the purge is not needed (N in S1125), the process proceeds to step S1128.

In step S1126, the injecting apparatus 5 removes the nozzle 52 entirely from the opening portion 61a of the fixed platen 61. Then in step S1127, the injecting apparatus 5 performs purge. The process then proceeds to step S1129. In step S1128, the injecting apparatus 5 removes the nozzle a predetermined distance to prevent a collision between the nozzle 52 and a mold being ejected or inserted.

Figure 12:
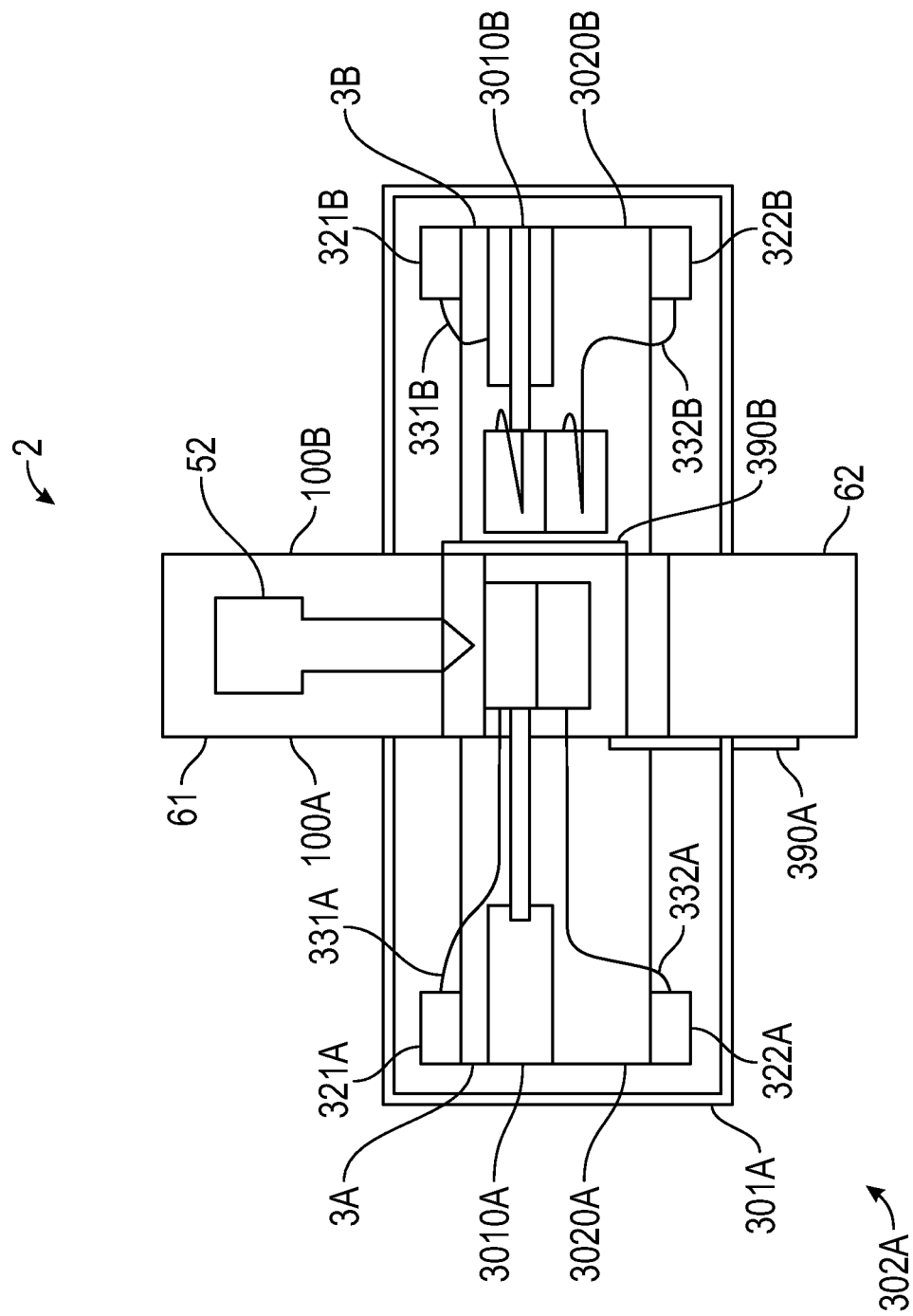
FIG. 12 illustrates opening a mold door according to an exemplary embodiment.

In step S1129, the clamping apparatus 6 slightly opens the mold 100A by moving the movable platen 62 away from the movable mold 102. In step S1130, the clamping apparatus 6 adjusts the position of the movable platen 62 to accommodate the next mold 100B in between the fixed platen 61 and the movable platen 62, as illustrated in FIG. 12. In another exemplary embodiment, steps S1124 can be performed simultaneously with steps S1125 to S1130.

Figure 13:
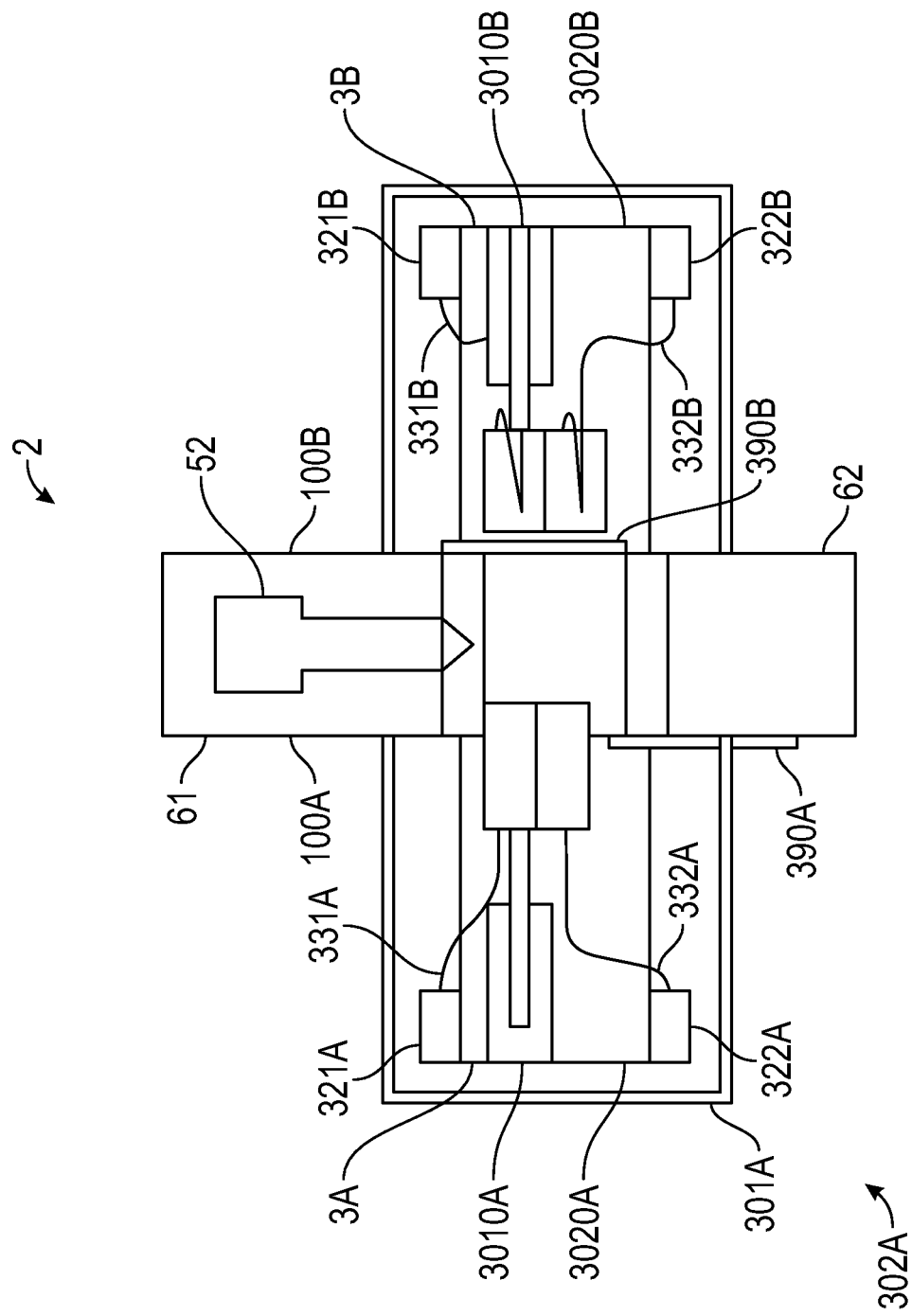
FIG. 13 illustrates a conveyance unit ejecting a mold 100 to the conveyor apparatus according to an exemplary embodiment.
Figure 14:
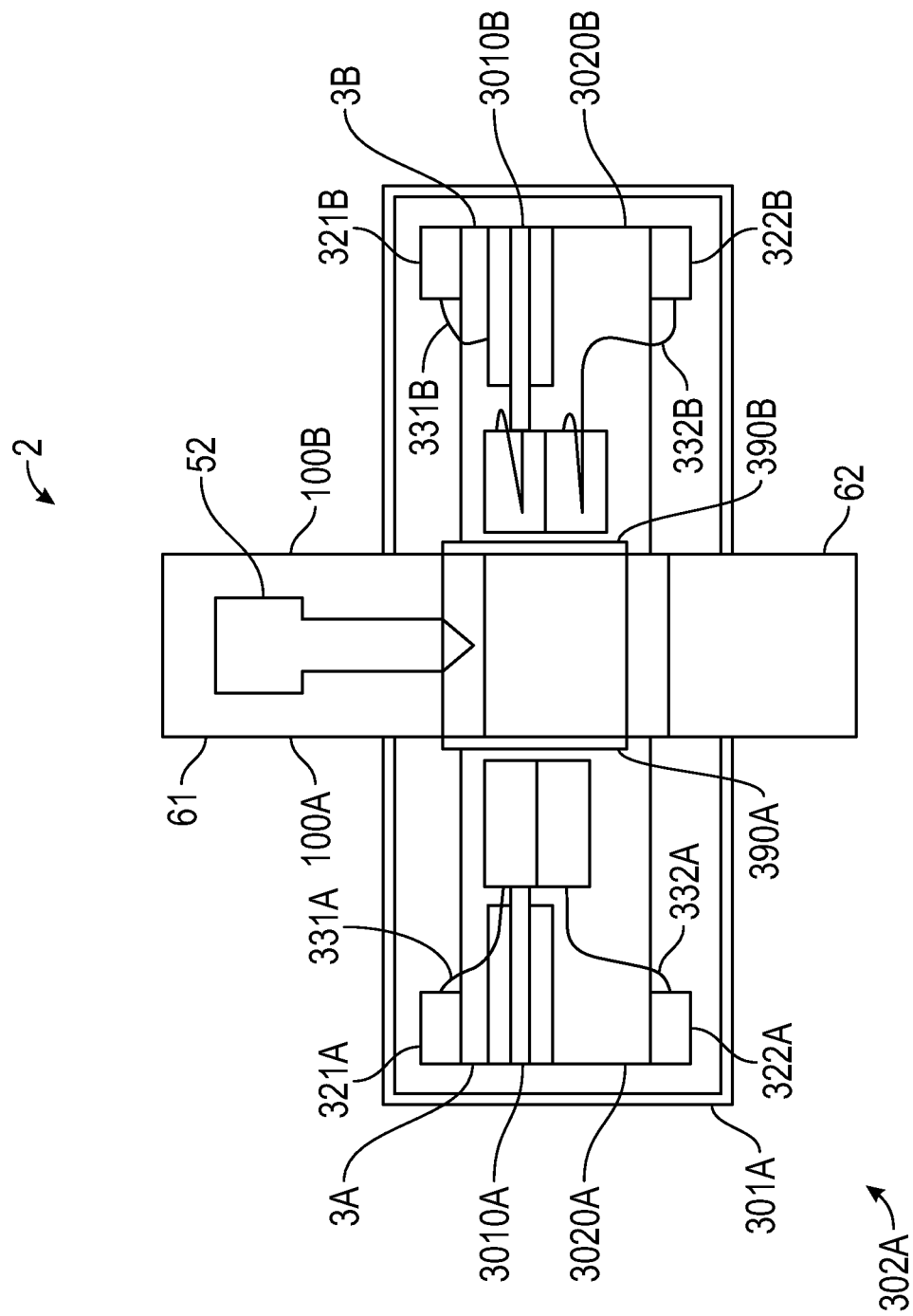
FIG. 14 illustrates closing a mold door closing according to an exemplary embodiment.

Steps S1132 to S1134 are performed in parallel to step S1130. In step S1132, the controller 41 updates the state of the IMM2 to 'Mold ejection ready (left)'. In step S1133, the conveyance unit 31A ejects the mold 100A to the conveyor apparatus 3A, as illustrated in FIG. 13. In step S1134, the mold door 390A is closed, as illustrated in FIG. 14.

Figure 15:
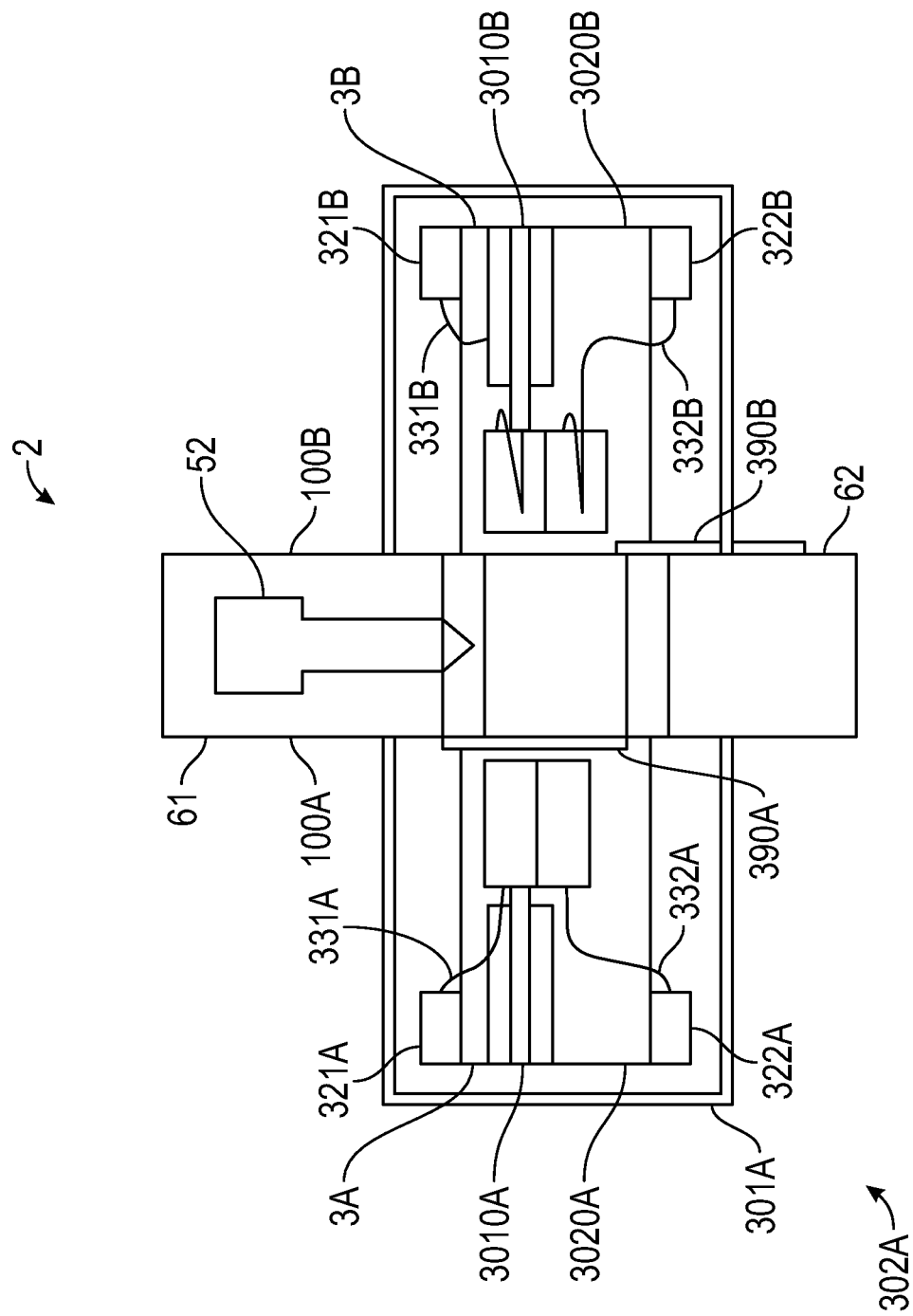
FIG. 15 illustrates opening a mold door according to an exemplary embodiment.

After step S1134, the process proceeds to step S1135 and step S1136. In step S1135, the controller 41 determines if the mold 100B on the conveyor apparatus 3B is ready for insertion. The controller 41 obtains the state of the mold 100B on the conveyor apparatus 3B and determines if the state is 'placed on conveyor—ready'. If the mold 100B is on the conveyor apparatus 3B, the controller 41 determines that the mold is ready for insertion and the process returns to step S1104. The above-described steps starting at step S1104 were described with respect to mold 100A, conveyor apparatus 3A, mold door 390A, etc. Following step S1135, these steps are performed with respect to mold 100B, conveyor apparatus 3B, mold door 390B, etc. For example, in step S1104, the mold door 390B is opened as illustrated in FIG. 15.

Figure 16:
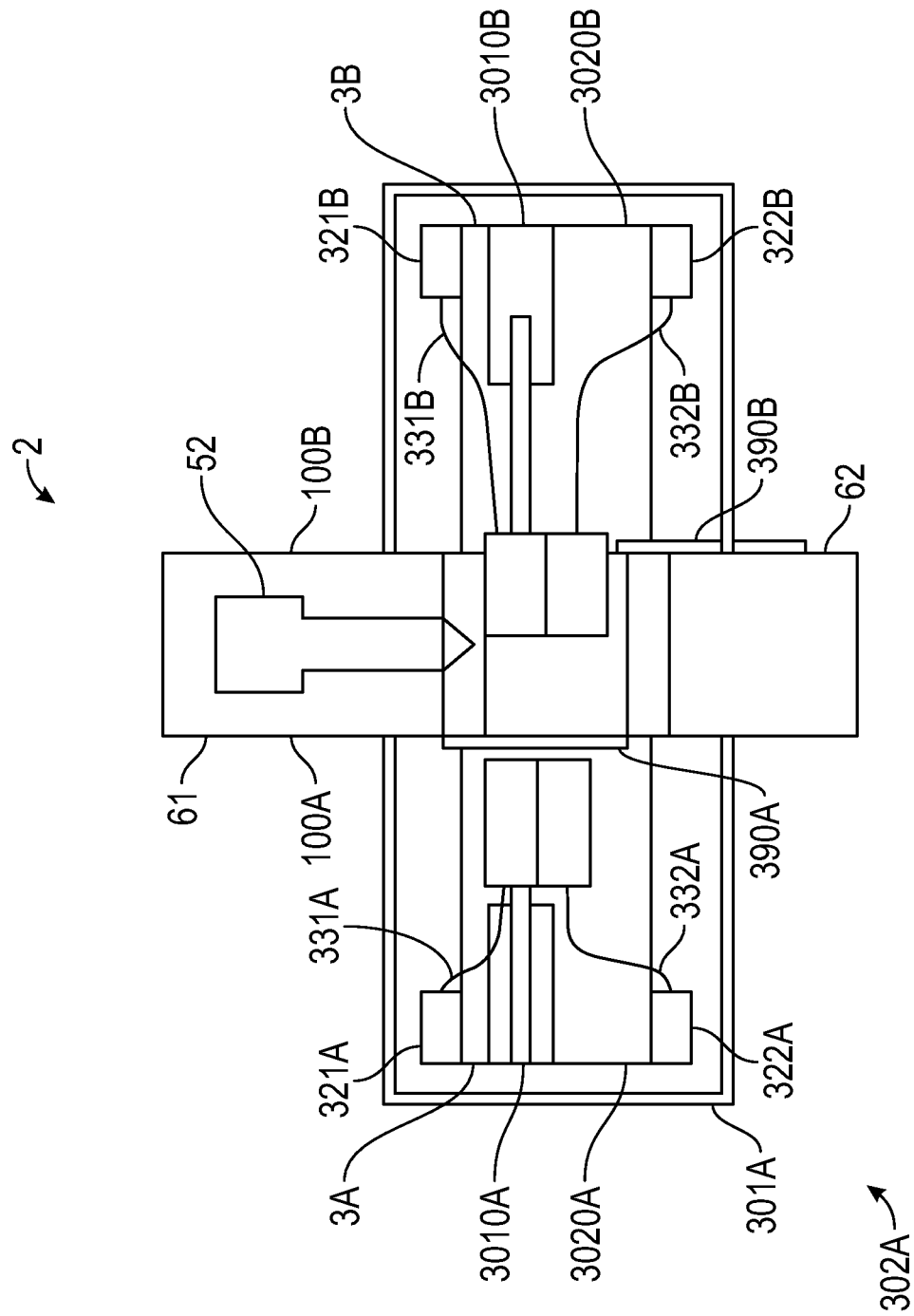
FIG. 16 illustrates inserting a mold according to an exemplary embodiment.

Controller 42B performs step S1106 to control the conveyance unit 31B to insert the mold 100B as illustrated in FIG. 16.

Step S1109 is performed by the clamping apparatus 6 to close the mold 100B. The injecting apparatus 5 performs step S1111 to move the nozzle forward so that the tip of the nozzle 52 contacts the mold 100B. The injecting apparatus 5 and the clamping apparatus 6 perform step S1112, where the injecting apparatus 5 injects the melted resin into the cavity of the mold 100B, and the clamping apparatus 6 holds the pressure inside the mold 100B.

Steps S1136 to S1144 are performed at the conveyor 3A for setting up a new mold 100A. In step S1136, the controller 42A obtains the temperature of the mold 100A for which the temperature controllers 321A and 322A lower the temperature. The controller 42A determines if the obtained temperature is less than or equal to the $1^{st}$ temperature. If the obtained temperature is less than or equal to the $1^{st}$ temperature, the controller 42A determines that the temperature of the mold 100A is cold enough to be unloaded, and the process proceeds to step S1137. If the temperature is greater than the $1^{st}$ temperature, the process waits at step S1136 until the temperature drops. In step S1137, the alert device 350A starts notifying operators that the mold 100A is ready for unloading. Periodic monitoring of the temperature is not required due to the notification. After step S1136, the conveyor door 302A can be opened.

After the temperature becomes lower than the $1^{st}$ temperature, fluid flow in the hoses 331A and 332A is stopped, which results in the temperature controllers 321A and 322A stopping lowering of the temperature.

In step S1138, the controller 42A determines if the hoses 331A and 332A are disconnected from the mold 100A. The disconnection can be determined by receiving outputs of a sensor (not illustrated) for monitoring connection or disconnection of the hoses 331A and 332A. The disconnection can also be determined by receiving confirmation via a user interface that the hoses 331A and 332A are disconnected. If the hoses 331A and 332A are disconnected, the process proceeds to step S1139. If the hoses 331A and 332A are not disconnected, the process remains at step S1138 to wait until the hoses 331A and 332A are determined to be disconnected.

In step S1139, the controller 42A determines if the mold 100A is unloaded from the conveyor apparatus 3A. Unloading can be determined by receiving outputs of a sensor (not illustrated) that detects a mold on the conveyor apparatus 3A. Unloading can also be determined by receiving via a user interface that the mold 100A is unloaded. If the mold 100A is determined to be unloaded, the process proceeds to step S1140. If the mold 100A is not determined to be unloaded, the process remains at step S1139 to wait until the mold 100A is unloaded.

In step S1140, the controller 42A determines if a new mold is loaded onto the conveyor apparatus 3A. The determination can be made using similar methods to the methods used in step S1139. If it is determined that the new mold is loaded onto the conveyor apparatus 3A, the process proceeds to step S1141. If it is determined that the new mod is not loaded, then the process remains at step S1140 to wait until the new mold is loaded.

In step S1141, the controller 42A determines if the hoses 331A and 332A are connected to the mold 100A. The connection can be determined using similar methods to the methods used in step S1138. If it is determined the hoses 331A and 332A are connected, the process proceeds to step S1142. If it is determined that the hoses 331A and 332A are not connected, the process remains at step S1141 to wait until the hoses 331A and 332A are connected.

In another exemplary embodiment, a single input received via a user interface can be associated with all or part of the confirmations of disconnection, unloading, loading, and connection described above with respect to steps S1138 to S1141.

In step S1142, the temperature controllers 321A and 322A start raising the temperature of the new mold up to the $2^{nd}$ temperature. This corresponds to the Temperature Raising 1028 in FIG. 10. In step S1143, the alert device 350A starts notifying operators that mold insertion is ready. In step S1144, the controller 42A updates the state of the new mold to 'placed on conveyor—ready'. The mold is now ready and waiting for insertion.

Figure 17:
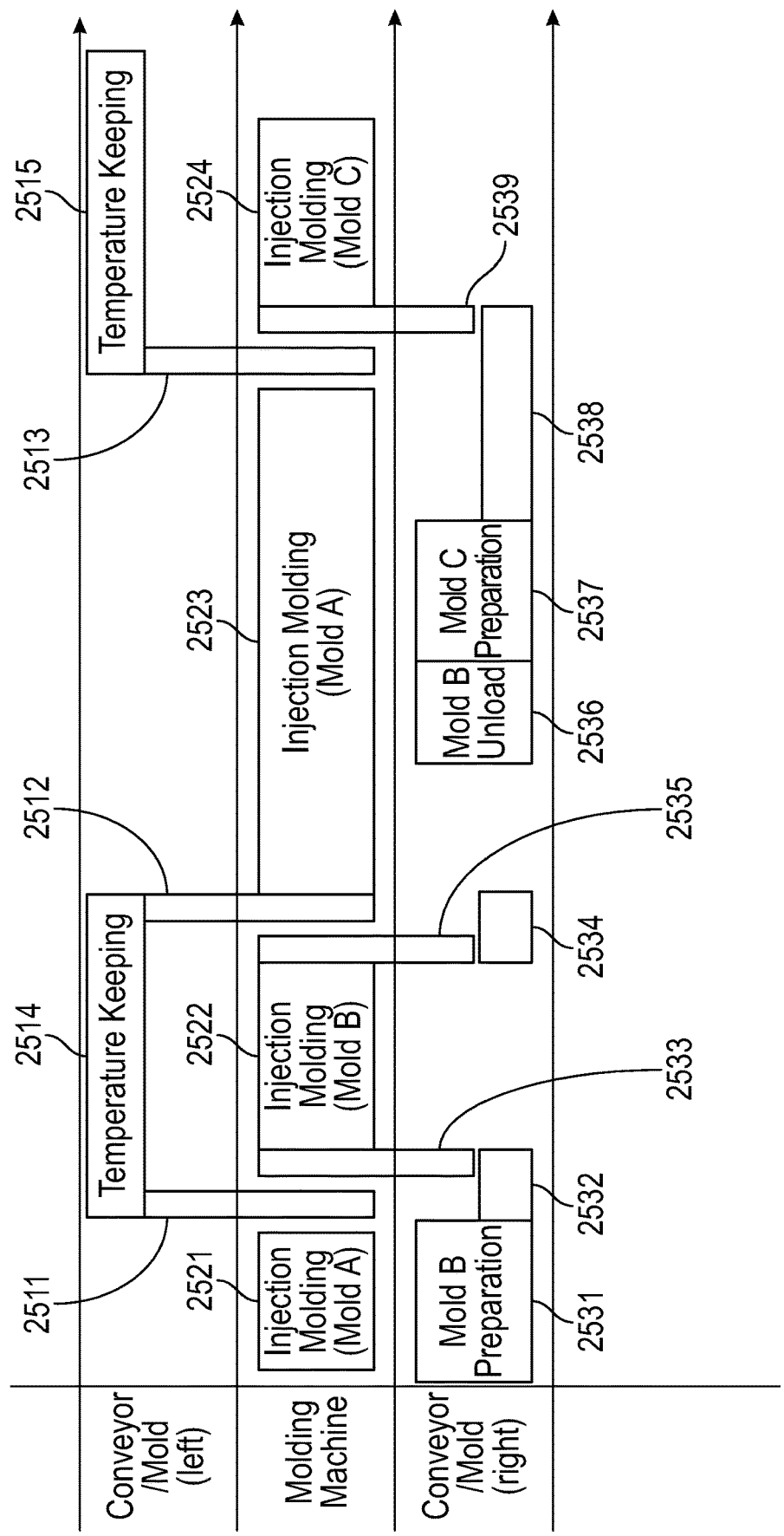
FIG. 17 illustrates exemplary processes in a normal sequential molding mode of a different exemplary embodiment.

FIG. 17 illustrates exemplary processes in the normal sequential molding mode, different from the scenario illustrated in FIG. 10. The alert device 350A/350B and associated processes are not illustrated in FIG. 17 because the processes are the same as those described with reference to FIG. 10. In the present exemplary processes, the number of shots for the mold A is much larger than for mold B and mold C, which are inserted and ejected by the conveyor apparatus 3B.

The IMM2 performs injection molding with the mold A (Injection Molding (mold A) 2521) and then performs injection molding with the mold B (Injection Molding (mold B) 2522). The IMM2 then resumes the injection molding with the mold A (Injection Molding (mold A) 2523), and then performs the injection molding with the mold C (Injection Molding (mold C) 2524).

The conveyor apparatus 3A ejects the mold A after the injection molding 2521 (mold A ejection 2511), inserts the mold A (mold A Insertion 2512) right after the mold B ejection (mold B ejection 2535), and ejects the mold A (mold A ejection 2513) after the Injection Molding (mold A) 2523. In response to completion of the Injection Molding (mold A) 2521 or Injection Molding (mold A) 2523, the temperature controllers) 321A and 322A control the temperature of the mold A so that the temperature of the mold A is maintained at the $2^{nd}$ temperature (Temperature Keeping 2514 or Temperature Keeping 2515).

In another exemplary embodiment, the temperature of the mold A does not need to be maintained at the $2^{nd}$ temperature. The temperature controllers 321A and 322A raise the temperature of the mold A to the $2^{nd}$ temperature by the time right before the start of the Injection Molding (mold A) 2523.

The mold B (Mold B preparation 2531) is prepared at the conveyor apparatus 3B, and then the temperature controllers 321B and 322B start raising the temperature to the $2^{nd}$ temperature (Temperature Raising 2532). As the Temperature Raising 2532 raises the temperature, the conveyance unit 31B inserts the mold (mold B Insertion 2533) after the mold A ejection 2511 and before the injection molding (mold B) 2522. Upon completion of the Injection Molding (mold B) 2522, the temperature controllers 321B and 322B start lowering the temperature of the mold B (Temperature Lowering 2534) to the $1^{st}$ temperature. After the Injection Molding (mold B) 2522, the conveyance unit 31B ejects the mold B (mold B ejection 2535), before the mold A Insertion 2512.

After the Temperature Lowering 2534, the mold B is unloaded at the conveyor apparatus 3B (Mold B Unload 2536) and the mold C is prepared (Mold C Preparation 2537). The temperature controllers 321B and 322B then start raising the temperature of the mold C (Temperature Raising 2538). The conveyance unit 31B then inserts the mold C (mold C Insertion 2539).

To improve productivity, the temperature of the mold B or the mold C reaches the $2^{nd}$ temperature by the time right before the injection molding with the mold B or the mold C begins. The controller 41 stores the standard or average time for raising the temperature of the mold B or the mold C, and determines, backwards from the stored time, the time to stop the injection molding in the Injection Molding (mold A) 2521 or the Injection Molding (mold A) 2523.

In another exemplary embodiment, in addition to the above-described processes of FIG. 17, the alert device 350A continues issuing a warning until the injection molding with the mold A is completed so that an operator does not need to be in the conveyor area of the conveyor apparatus 3A. In yet another exemplary embodiment, the alert device 350A does not issue any warning because in a normal situation operators do not need to be in the conveyance area of the conveyor apparatus 3A. These exemplary embodiments enable reduction in the number of warnings issued by the injection molding system 1, thus enabling operators to concentrate on the conveyor apparatus 3B side of the injection molding system 1.

Figure 18:
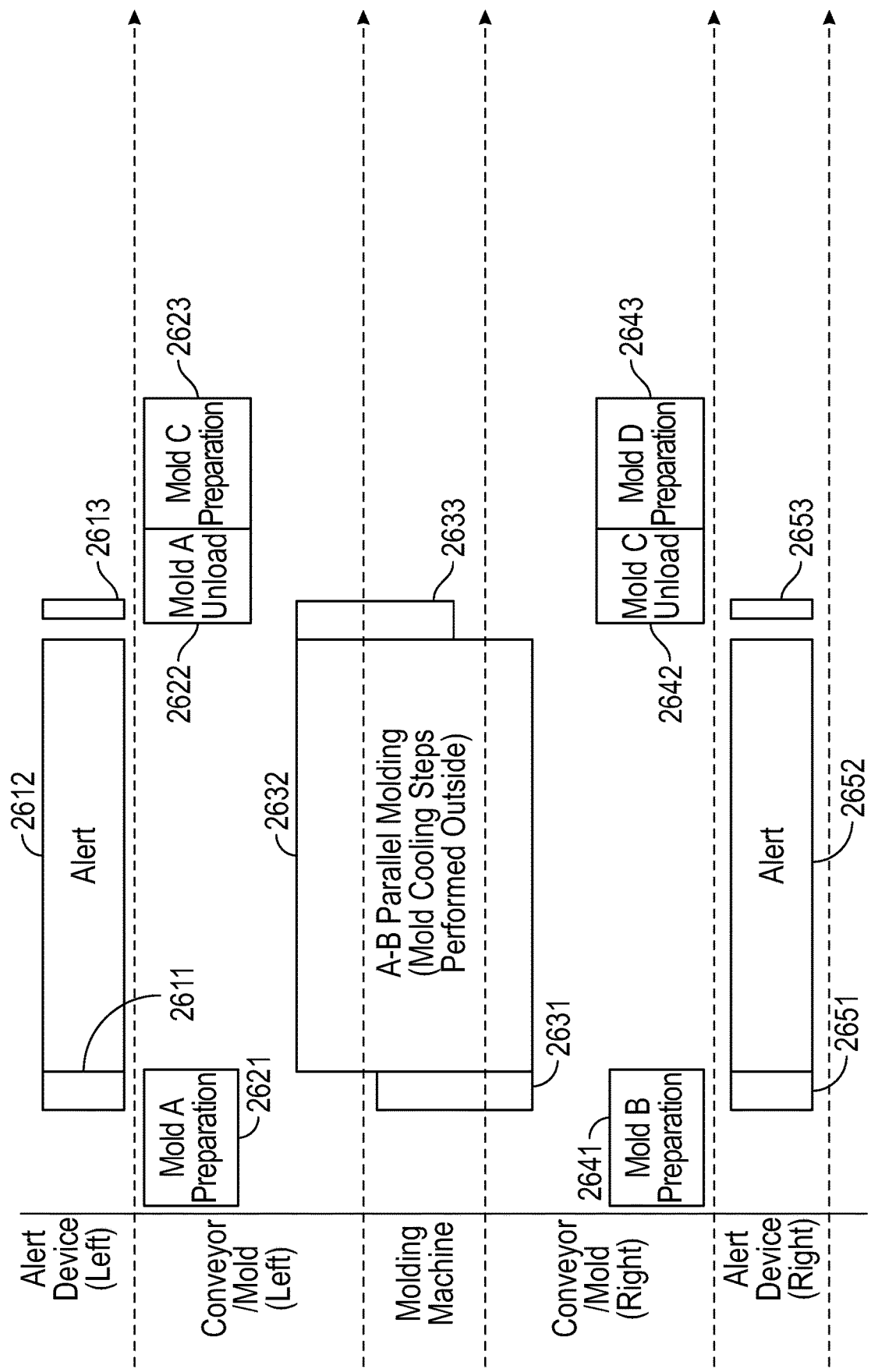
FIG. 18 illustrates a timing chart illustrating exemplary processes of components of an injection molding system in parallel molding mode according to an exemplary embodiment.
Figure 19:
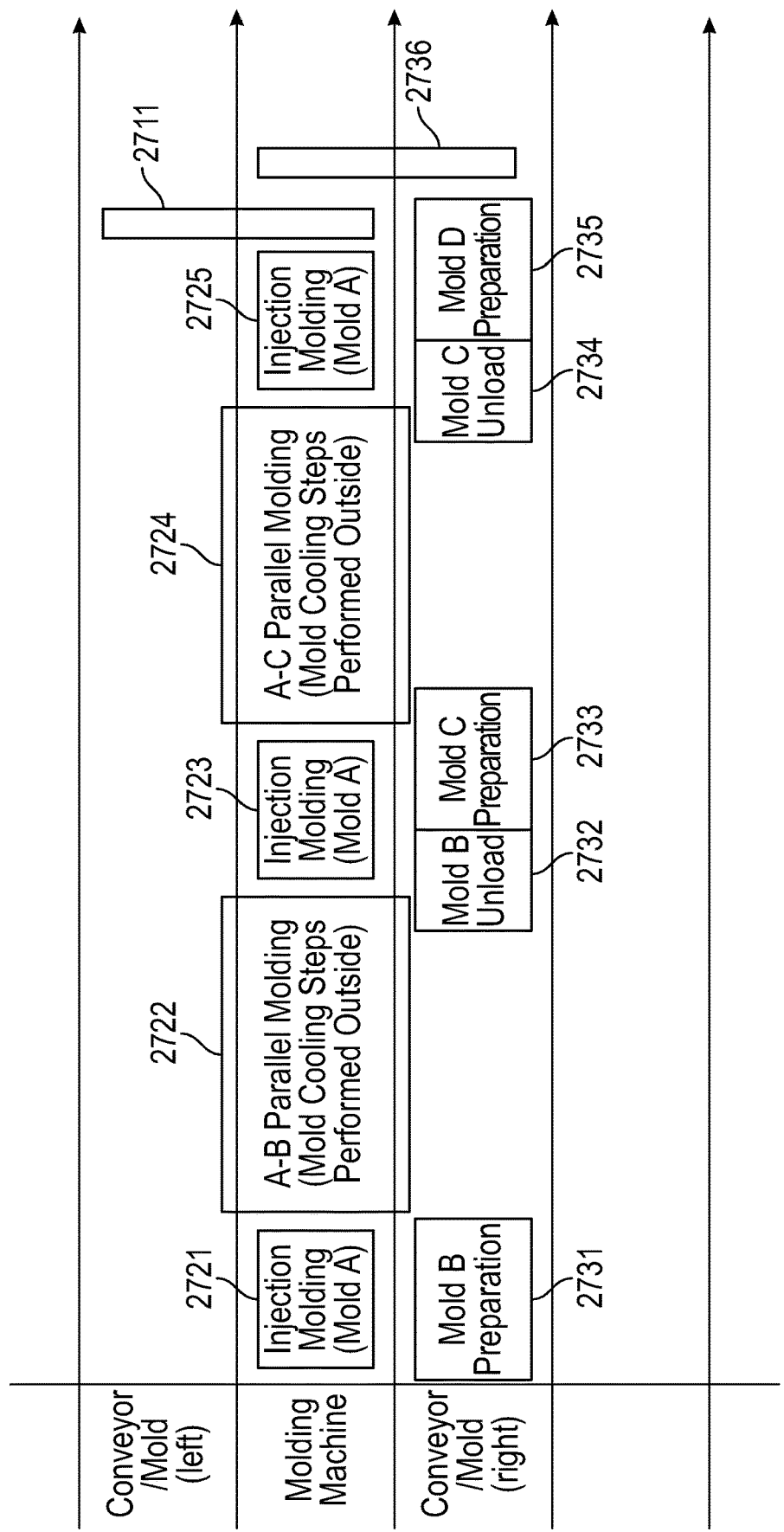
FIG. 19 illustrates a timing chart illustrating exemplary processes of components of an injection molding system in a combination mode according to an exemplary embodiment.

FIG. 18 illustrates a timing chart illustrating the exemplary processes of the components in the injection molding system 1 in the parallel molding mode. Initially, the mold A is prepared at the conveyor apparatus 3A (Mold A preparation 2621), and the mold B prepared at the conveyor apparatus 3B (Mold B preparation 2641). While preparation of the mold A and the mold B can be done sequentially, in order to reduce the idle time of the IMM2, preparation of the mold A and the mold B can be performed simultaneously as illustrated in FIG. 19.

After the preparations are completed, the injection molding system 1 performs parallel molding. Because in this scenario the Mold A preparation 2621 is completed earlier than the Mold B preparation 2641, the conveyor apparatus 3B inserts the mold B first, the clamping apparatus 6 closes the mold B, the injection apparatus 6 injects the melted resin, the clamping apparatus 6 holds the pressure of the mold B, and the conveyance unit 3B ejects the mold B to the conveyor apparatus 3B (process 2631).

After ejection of the mold B, the conveyance unit 31A inserts the mold A to the IMM2, and the same process as process 2631 is performed with the mold A. While the process is performed with the mold A, the mold B is in the cooling process on the conveyor apparatus 3B.

After the cooling process with the mold B, and after the ejection of the mold A to the conveyor apparatus 3A, the conveyor apparatus 3B inserts the mold B into the IMM2, the clamping apparatus 6 opens the mold B, the take-out robot 7 removes a molded part from the cavity of the mold B, the clamping apparatus 6 closes the mold B, injecting apparatus 5 injects melted resin into the cavity of the mold B, the clamping apparatus 6 holds the pressure of the mold B, and then the conveyor 3B ejects the mold B to the conveyor apparatus 3A. While these processes are being performed with the IMM2 and with the mold B, the mold A is in the cooling process on the conveyor apparatus 3A. In the parallel molding mode, a cooling process of one mold is performed external to the IMM2 while other processes are performed internal to the IMM2 (A-B Parallel Molding (mold cooling steps performed outside) 2632).

At the end of the parallel molding in this scenario, the conveyor apparatus 3B inserts the mold B, the clamping apparatus 6 opens the mold B, the take-out robot 7 removes a molded part, the clamping apparatus 6 closes the mold B, and the conveyance unit 31B ejects the mold B to the conveyor apparatus 3B (the process 2633). Mold A is ejected to the conveyor apparatus 3A during process 2633. After the A-B Parallel Molding (mold cooling steps performed outside) 2632 and the process 2633, the mold A is replaced with the mold C at the conveyor apparatus 3A by unloading the mold A from the conveyor apparatus 3A (mold A Unload 2622) and preparing the mold C (Mold C preparation 2623).

At the conveyor apparatus 3B, the mold B is replaced with the mold D by unloading the mold B from the conveyor apparatus 3B (mold B Unload 2642), and preparing the mold D (Mold D preparation 2643). The Mold A preparation 2621, Mold B preparation 2641, the Mold C preparation 2623, or the Mold D preparation 2643 include a process of raising the temperature of the mold up to the $2^{nd}$ temperature. The $2^{nd}$ temperature for each of the molds A~D can be different from one another.

After the preparations of the molds C and D, the injection molding system 1 performs the injection molding in the parallel molding mode with the molds C and D. In this scenario the Mold C preparation 2623 is completed earlier than the Mold D preparation 2643, and the mold C is inserted first and the mold D is inserted later.

The alert device 350A issues an advance warning (Advance warning 2611) in response to completion of the Mold A preparation 2621 for a predetermined period of time. Then, during the A-B Parallel Molding (mold cooling steps performed outside) 2632, the alert device 350A issues an alert (Alert 2612) notifying operators that the mold A is intermittently moved in the conveyor area. After the A-B Parallel Molding (mold cooling steps performed outside) 2632 is finished and the temperature of the mold A drops to the $1^{st}$ temperature, the alert device 350A notifies operators that the mold A is ready for unloading (Unload notice 2613).

Alert device 350B issues an advance warning (Advance warning 2651) after the Mold B preparation 2641 is completed and an alert during the A-B Parallel Molding (mold cooling steps performed outside) 2632. After the temperature of the mold D drops to the $1^{st}$ temperature, the alert device 350B notifies operators that the mold B is ready for unloading (Unload Notice 2653).

FIG. 19 illustrates a timing chart illustrating the exemplary processes of the components in the injection molding system 1 in a combination mode. In the combination mode, the IMM2 performs injection molding in both the parallel molding mode and the normal sequential molding mode. The present exemplary process is the same as the scenario in FIG. 17, where the estimated total time of the injection molding with the mold A is much greater than that with the mold B, the mold C, or the mold D.

Initially, the normal molding is performed by the IMM2 (Injection molding (mold A) 2721) while the mold B is prepared (Mold B preparation 2731) at the conveyor apparatus 3B. The Mold B preparation 2731 includes the process of raising the temperature of the mold B up to the $2^{nd}$ temperature, which is performed by the temperature controllers 321B and 322B. After the mold B preparation 2731 the IMM2, the conveyor apparatus 3A and the conveyor apparatus 3B perform injection molding in the parallel molding mode with the molds A and B (A-B Parallel Molding (mold cooling steps performed outside) 2722). After the predetermined number of shots are completed, the IMM2 starts performing normal injection molding with only the mold A (Injection Molding (mold A) 2723).

While the Injection Molding (mold A) 2723 is performed, the mold B is unloaded (Mold B Unload 2732) and the mold C (Mold C Preparation 2733) is prepared at the conveyor apparatus 3B. The Mold C Preparation 2733 also includes a process of raising the temperature of the mold C up to the $2^{nd}$ temperature, which is performed by the temperature controllers 321B and 322B. In response to the Mold C Preparation 2733, the injection molding system 1 returns to parallel molding mode with the molds A and C at this time (A-C Parallel Molding (mold cooling steps performed outside) 2724).

After the A-C Parallel Molding (mold cooling steps performed outside) 2724, the IMM2 performs injection molding with only the mold A (Injection Molding (mold A) 2725). During the Injection Molding (mold A) 2725, the mold C is unloaded (Mold C Unload 2734) and the mold D prepared (Mold D Preparation 2735).

In these exemplary processes, the predetermined number of shots with the mold A are completed in the Injection Molding (mold A) 2725 and the conveyor 3A ejects the mold A to the conveyor apparatus 3A (mold A ejection 2711). After the Mold D Preparation 2735, the conveyor apparatus 3B inserts the mold D into the IMM2 (mold D Insertion 2736), and then injection molding with the mold D is performed in the IMM2. In these exemplary processes, the IMM2 performs normal injection molding with one mold while operators prepare another mold and after the preparation parallel molding is performed in the IMM2, which improves productivity of the injection molding system 1.

In the exemplary embodiment, cooling processes in the Injection Molding (mold A) 2721 are performed in the IMM2, whereas the cooling processes in the A-B Parallel Molding (mold cooling steps performed outside) 2722 can be performed external to the IMM2 at either the conveyor apparatus 3A or conveyor apparatus 3B. The difference in cooling processes can have affect the difference of the molded parts from the same mold. In order to reduce any differences, during the cooling processes in the A-B Parallel Molding (mold cooling steps performed outside) 2722, the clamping apparatus 6 can be released from the movable mold 102. This results in only the self-closing unit 103 maintaining the closing state of the mold 100A/100B, which has the same effect as the cooling processes in the Injection Molding (mold A) 2721.

While the above-described exemplary embodiments discuss illustrative embodiments, the present disclosure is not limited to these exemplary embodiments.

According to an exemplary embodiment, an injection molding system includes an injection molding machine that performs injection molding with a mold, a first conveyor apparatus on one side of the injection molding machine for ejecting and inserting a first mold through a first opening of the injection molding machine, and a second conveyor apparatus on the other side of the injection molding machine for ejecting and inserting a second mold through a second opening of the injection molding machine. The injection molding machine also includes a first door to cover the first opening and a second door to cover the second opening. The injection molding machine includes at least one controller to stop injection molding with the first mold, in response to opening of the second door.

According to another exemplary embodiment, an injection molding system includes an injection molding machine that performs injection molding with a mold, a first conveyor apparatus on one side of the injection molding machine that ejects and inserts a first mold through a first opening of the injection molding machine, and a second conveyor apparatus on the other side of the injection molding machine that ejects and inserts a second mold through a second opening of the injection molding machine. The injection molding system also includes first safety walls with a first conveyor door that defines a first closed region enclosing the first conveyor apparatus, second safety walls with a second conveyor door that defines a second closed region. The injection molding system includes at least one controller that stops injection molding with the first mold in response to opening of the first conveyor door.

According to yet another exemplary embodiment, an injection molding system includes an injection molding machine that performs injection molding with a mold, a first conveyor apparatus on one side of the injection molding machine that ejects and inserts a first mold through a first opening of the injection molding machine, and a second conveyor apparatus on the other side of the injection molding machine that ejects and inserts a second mold through a second opening of the injection molding machine. The injection molding system also includes one or more first temperature controllers that control temperature of a first mold (100A), and one or more second temperature controllers that control temperature of a second mold (100B). The first temperature controller starts raising the temperature of the second mold on the second conveyor apparatus while the injection molding machine performs injection molding with the first mold.

According to still yet another exemplary embodiment, an injection molding system includes an injection molding machine that performs injection molding with a mold, a conveyor apparatus on one side of the injection molding machine that ejects and inserts a mold through an opening of the injection molding machine. The injection molding machine includes an injecting machine with a nozzle that moves in one direction to contact the mold in the injection molding machine and moves in the opposite direction to disengage from the mold being ejected by the first conveyor apparatus.

According to another exemplary embodiment, an injection molding system includes an injection molding machine that performs injection molding with a mold, a conveyor apparatus on one side of the injection molding machine that ejects and inserts a mold through an opening of the injection molding machine. The injection molding system also includes one or more temperature controllers that control temperature of the mold, and an alert device that issues a notification in response to a detection that the temperature controller lowers the temperature of the mold on the conveyor apparatus to a predetermined temperature.

According to yet another exemplary embodiment, an injection molding system includes an injection molding machine that performs injection molding with a mold, a conveyor apparatus on one side of the injection molding machine that ejects and inserts a mold through an opening of the injection molding machine. The injection molding system also includes one or more temperature controllers that control temperature of the mold and an alert device that issues a notification in response to a detection that the temperature controller raises the temperature of the mold on the conveyor apparatus to a predetermined temperature.

Definitions

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An injection molding system comprising:
   an injection molding apparatus configured to perform injection molding;
   a first conveyor apparatus on one side of the injection molding apparatus, configured to eject and insert a first mold through a first opening of the injection molding apparatus; and
   a second conveyor apparatus on a second side of the injection molding apparatus, configured to eject and insert a second mold through a second opening of the injection molding apparatus,
   wherein the improvement of the injection molding system comprises:
     a first door capable of moving between an open position where the first door does not cover the first opening and a close position where the first door covers the first opening,
     a second door capable of moving between an open position where the second door does not cover the second opening and a close position where the second door covers the second opening, and
     a controller configured to enable injection molding with the first mold while the second mold is replaced with a third mold outside the injection molding apparatus in a case where the second door is at the close position, and prohibit injection molding with the first mold while the second mold is replaced with the third mold in a case where the second door is at the open position.

2. The injection molding system of claim 1, wherein the controller is further configured to prohibit starting injection molding with the first mold in a case where the second door is at the open position.

3. The injection molding system of claim 1, wherein the controller is further configured to prohibit the first conveyor apparatus from conveying the first mold in a case where the second door is at the open position.

4. The injection molding system of claim 1, wherein the controller is further configured to enable the first conveyor apparatus to convey the first mold in a case where the second door is at the close position.

5. The injection molding system of claim 1, wherein the controller is further configured to prohibit the first conveyor apparatus from starting conveying the first mold in a case where the second door is at the open position.

6. The injection molding system of claim 1 further comprising a user interface configured to receive an input to start the first conveyor apparatus to move the first mold.

7. The injection molding system of claim 1, wherein the controller is further configured to enable the second door to open after adjusting a position of a platen of the injection molding apparatus for the second mold.

8. The injection molding system of claim 1, further comprising an alert device configured to issue a notification that injection molding is prohibited.

9. The injection molding system of claim 1, further comprising:
   walls, including a door, around the first conveyor apparatus, wherein the controller is further configured to prohibit injection molding with the first mold in a case where the door of the walls is opened.

10. The injection molding machine of claim 9, wherein the first conveyor apparatus further comprises:
    a first actuator for moving the first mold;
    a first connection member connected to the actuator and configured to connect to the first mold to transmit force from the first actuator to the first mold,
    wherein the walls restrict access to the first actuator and the first connection member.

11. The injection molding system of claim 1, further comprising:
    walls including a door around the first conveyor apparatus,
    wherein the controller is further configured to prohibit the first conveyor apparatus from conveying the first mold in a case where the door of the walls is opened.

12. The injection molding system of claim 1, wherein the first door is open while the injection molding with the first mold is being performed.

13. The injection molding system of claim 1, further comprising:
    walls including a door around the second conveyor apparatus,
    wherein the controller is configured to enable the door to open while the injection molding is performed with the first mold in a case where the second door is at the close position.

14. The injection molding system of claim 1, further comprising:
    walls, including a door, around the first conveyor apparatus,
    wherein the first door is configured to restrict access via the first opening inside the injection molding apparatus in a case where the first door is at the close position, and,
    wherein the walls with the door in a closed state is configured to restrict access via the first opening in a case where the first door is at the open position.

15. An injection molding system comprising:
    an injection molding apparatus configured to perform injection molding, including:
      a first opening on one side of the injection molding apparatus;

a second opening on a second side of the injection molding apparatus; and a conveyor apparatus on the one side of the injection molding apparatus, configured to eject and insert a first mold through the first opening and a second mold through the second opening, wherein the improvement of the injection molding system comprises:

a first door capable of moving between an open position where the first door does not cover the first opening and a close position where the first door covers the first opening;

a second door capable of moving between an open position where the second door does not cover the second opening and a close position where the second door covers the second opening; and a controller configured to enable injection molding with the first mold while the second mold is replaced with a third mold outside the injection molding apparatus in a case where the second door is at the close position, and prohibit injection molding with the first mold while the second mold is replaced with the third mold in a case where the second door is at the open position.

16. The injection molding system of claim 13, wherein the controller is configured to prohibit injection molding with the first mold and the second mold alternately in a case in which the conveyor door is open.

* * * * *